United States Patent
Hirotsu et al.

(10) Patent No.: US 12,248,504 B2
(45) Date of Patent: Mar. 11, 2025

(54) DOCUMENT CONTAINER WITH CANDIDATE DOCUMENTS

(71) Applicant: DocuSign, Inc., San Francisco, CA (US)

(72) Inventors: David Minoru Hirotsu, Torrance, CA (US); Muhammad Omer Farooq, Lynnwood, WA (US); John Michael Morrissey, Naperville, IL (US); Abhitheja Pinnadari, Oswego, IL (US); Laxman Rapolu, Naperville, IL (US)

(73) Assignee: Docusign, Inc., San Francisco, CA (US)

( * ) Notice: Subject to any disclaimer, the term of this patent is extended or adjusted under 35 U.S.C. 154(b) by 0 days.

(21) Appl. No.: 18/326,761

(22) Filed: May 31, 2023

(65) Prior Publication Data

US 2024/0403349 A1    Dec. 5, 2024

(51) Int. Cl.
*G06F 16/35*    (2019.01)
*G06F 16/358*    (2025.01)
(Continued)

(52) U.S. Cl.
CPC .......... *G06F 16/358* (2019.01); *G06F 16/383* (2019.01); *G06V 30/19093* (2022.01)

(58) Field of Classification Search
CPC ................ G06F 16/358; G06F 16/383; G06V 30/19093
(Continued)

(56) References Cited

U.S. PATENT DOCUMENTS 5,040,142 A    8/1991    Mori et al.
5,220,675 A    6/1993    Padawer et al.
(Continued)

FOREIGN PATENT DOCUMENTS

AU    2012283812 B2    12/2016
CN    101136046 A    3/2008
(Continued)

OTHER PUBLICATIONS

Borozdin, "DocuSign Connect Service Guide", Scribd, Docusign Inc., Feb. 1, 2011, 31 pp., URL: https://www.scribd.com/document/47986438/DocuSign-Connect-Service-Guide.
(Continued)

*Primary Examiner* — Cam Linh T Nguyen
(74) *Attorney, Agent, or Firm* — Shumaker & Sieffert, P.A.

(57) ABSTRACT

Techniques are described for a system document management comprising one or more processors having access to a memory. The system is configured to determine an attribute for an input document for execution by a signer. The system is also configured to generate a similarity score for each of a plurality of candidate documents using a machine learning model, wherein using the machine learning model comprises providing the attribute as an input to the machine learning model. The system is also configured to generate data for a graphical user interface comprising an indication of at least a subset of the candidate documents based on the similarity scores generated for each of the plurality of candidate documents. The system is configured to output, for display, the data to a user device.

20 Claims, 12 Drawing Sheets

(51) Int. Cl.
*G06F 16/383* (2019.01)
*G06V 30/19* (2022.01)

(58) Field of Classification Search
USPC .......................................................... 707/737
See application file for complete search history.

(56) References Cited

U.S. PATENT DOCUMENTS

| | | | |
|---|---|---|---|
| 5,222,138 A | 6/1993 | Balabon et al. | |
| 5,337,360 A | 8/1994 | Fischer | |
| 5,390,247 A | 2/1995 | Fischer | |
| 5,465,299 A | 11/1995 | Matsumoto et al. | |
| 5,544,255 A | 8/1996 | Smithies et al. | |
| 5,553,145 A | 9/1996 | Micali | |
| 5,615,268 A | 3/1997 | Bisbee et al. | |
| 5,629,982 A | 5/1997 | Micali | |
| 5,689,567 A | 11/1997 | Miyauchi | |
| 5,748,738 A | 5/1998 | Bisbee et al. | |
| 5,813,009 A | 9/1998 | Johnson et al. | |
| 5,832,499 A | 11/1998 | Gustman | |
| 5,872,848 A | 2/1999 | Romney et al. | |
| 5,898,156 A | 4/1999 | Wilfong | |
| 6,021,202 A | 2/2000 | Anderson et al. | |
| 6,067,531 A | 5/2000 | Hoyt et al. | |
| 6,085,322 A | 7/2000 | Romney et al. | |
| 6,092,080 A | 7/2000 | Gustman | |
| 6,119,229 A | 9/2000 | Martinez et al. | |
| 6,128,740 A | 10/2000 | Curry et al. | |
| 6,161,139 A | 12/2000 | Win et al. | |
| 6,185,587 B1 | 2/2001 | Bernardo et al. | |
| 6,185,683 B1 | 2/2001 | Ginter et al. | |
| 6,199,052 B1 | 3/2001 | Mitty et al. | |
| 6,210,276 B1 | 4/2001 | Mullins | |
| 6,237,096 B1 | 5/2001 | Bisbee et al. | |
| 6,282,552 B1 | 8/2001 | Thompson et al. | |
| 6,289,460 B1 | 9/2001 | Hajmiragha | |
| 6,321,333 B1 | 11/2001 | Murray | |
| 6,327,656 B2 | 12/2001 | Zabetian | |
| 6,367,010 B1 | 4/2002 | Venkatram et al. | |
| 6,367,013 B1 | 4/2002 | Bisbee et al. | |
| 6,446,115 B2 | 9/2002 | Powers | |
| 6,470,448 B1 | 10/2002 | Kuroda et al. | |
| 6,584,466 B1 | 6/2003 | Serbinis et al. | |
| 6,615,348 B1 | 9/2003 | Gibbs | |
| 6,658,403 B1 | 12/2003 | Kuroda et al. | |
| 6,671,805 B1 | 12/2003 | Brown et al. | |
| 6,728,762 B1 | 4/2004 | Estrada et al. | |
| 6,751,632 B1 | 6/2004 | Petrogiannis | |
| 6,754,829 B1 | 6/2004 | Butt et al. | |
| 6,796,489 B2 | 9/2004 | Slater et al. | |
| 6,807,633 B1 | 10/2004 | Pavlik | |
| 6,829,635 B1 | 12/2004 | Townshend | |
| 6,912,660 B1 | 6/2005 | Petrogiannis | |
| 6,931,420 B1 | 8/2005 | Silvester et al. | |
| 6,938,157 B2 | 8/2005 | Kaplan | |
| 6,944,648 B2 | 9/2005 | Cochran et al. | |
| 6,947,911 B1 | 9/2005 | Moritsu et al. | |
| 6,959,382 B1 | 10/2005 | Kinnis et al. | |
| 6,961,854 B2 | 11/2005 | Serret-Avila et al. | |
| 6,973,569 B1 | 12/2005 | Anderson et al. | |
| 6,990,684 B2 | 1/2006 | Futamura et al. | |
| 7,039,805 B1 | 5/2006 | Messing | |
| 7,059,516 B2 | 6/2006 | Matsuyama et al. | |
| 7,069,443 B2 | 6/2006 | Berringer et al. | |
| 7,093,130 B1 | 8/2006 | Kobayashi et al. | |
| 7,100,045 B2 | 8/2006 | Yamada et al. | |
| 7,103,778 B2 | 9/2006 | Kon et al. | |
| 7,162,635 B2 | 1/2007 | Bisbee et al. | |
| 7,167,844 B1 | 1/2007 | Leong et al. | |
| 7,197,644 B2 | 5/2007 | Brewington | |
| 7,237,114 B1 | 6/2007 | Rosenberg | |
| 7,340,608 B2 | 3/2008 | Laurie et al. | |
| 7,360,079 B2 | 4/2008 | Wall | |
| 7,395,436 B1 | 7/2008 | Nemovicher | |
| 7,424,543 B2 | 9/2008 | Rice, III | |
| 7,437,421 B2 | 10/2008 | Bhogal et al. | |
| 7,523,315 B2 | 4/2009 | Hougaard et al. | |
| 7,533,268 B1 | 5/2009 | Catoricini et al. | |
| 7,533,420 B2 | 5/2009 | Battagin et al. | |
| 7,554,576 B2 | 6/2009 | Erol et al. | |
| 7,562,053 B2 | 7/2009 | Twining et al. | |
| 7,568,101 B1 | 7/2009 | Catoricini et al. | |
| 7,568,104 B2 | 7/2009 | Berryman et al. | |
| 7,581,105 B2 | 8/2009 | Dietl | |
| 7,644,351 B1 | 1/2010 | Portnoy et al. | |
| 7,657,832 B1 | 2/2010 | Lin | |
| 7,660,863 B2 | 2/2010 | Boursetty et al. | |
| 7,788,259 B2 | 8/2010 | Patterson et al. | |
| 7,934,098 B1 | 4/2011 | Hahn et al. | |
| 7,953,977 B2 | 5/2011 | Maruyama et al. | |
| 8,103,867 B2 | 1/2012 | Spitz | |
| 8,132,013 B2 | 3/2012 | Meier | |
| 8,286,071 B1 | 10/2012 | Zimmerman et al. | |
| 8,517,823 B2 | 8/2013 | Nguyen et al. | |
| 8,588,483 B2 | 11/2013 | Hicks et al. | |
| 8,612,349 B1 | 12/2013 | Ledder et al. | |
| 8,756,432 B1* | 6/2014 | Chen | G06F 21/51 |
| | | | 713/193 |
| 8,886,648 B1* | 11/2014 | Procopio | G06F 16/93 |
| | | | 707/737 |
| 9,268,758 B2 | 2/2016 | Gonser et al. | |
| 9,971,754 B2 | 5/2018 | Gonser, Jr. et al. | |
| 10,013,411 B2* | 7/2018 | Sherry | G06F 40/174 |
| 11,593,439 B1* | 2/2023 | Avadhani | G06F 16/152 |
| 2001/0018739 A1 | 8/2001 | Anderson et al. | |
| 2001/0034835 A1 | 10/2001 | Smith | |
| 2002/0004800 A1 | 1/2002 | Kikuta et al. | |
| 2002/0019937 A1 | 2/2002 | Edstrom et al. | |
| 2002/0026427 A1 | 2/2002 | Kon et al. | |
| 2002/0026582 A1 | 2/2002 | Futamura et al. | |
| 2002/0040431 A1 | 4/2002 | Kato et al. | |
| 2002/0055945 A1 | 5/2002 | Endress et al. | |
| 2002/0069179 A1 | 6/2002 | Slater et al. | |
| 2002/0069358 A1 | 6/2002 | Silvester | |
| 2002/0082857 A1 | 6/2002 | Skordin et al. | |
| 2002/0129056 A1 | 9/2002 | Conant et al. | |
| 2002/0133470 A1 | 9/2002 | Gruber | |
| 2002/0138445 A1 | 9/2002 | Laage et al. | |
| 2002/0143711 A1 | 10/2002 | Nassiri | |
| 2002/0162000 A1 | 10/2002 | Bensler | |
| 2002/0178187 A1 | 10/2002 | Rasmussen et al. | |
| 2002/0184485 A1 | 12/2002 | Dray et al. | |
| 2002/0194219 A1 | 12/2002 | Bradley et al. | |
| 2002/0196478 A1 | 12/2002 | Struble | |
| 2003/0023625 A1 | 1/2003 | Thomason | |
| 2003/0048301 A1 | 3/2003 | Menninger | |
| 2003/0051016 A1 | 3/2003 | Miyoshi et al. | |
| 2003/0078880 A1 | 4/2003 | Alley et al. | |
| 2003/0120553 A1 | 6/2003 | Williams | |
| 2003/0120930 A1 | 6/2003 | Simpson et al. | |
| 2003/0131073 A1 | 7/2003 | Lucovsky et al. | |
| 2003/0140252 A1 | 7/2003 | Lafon et al. | |
| 2003/0217275 A1 | 11/2003 | Bentley et al. | |
| 2004/0054606 A1 | 3/2004 | Broerman | |
| 2004/0078337 A1 | 4/2004 | King et al. | |
| 2004/0107352 A1 | 6/2004 | Yui et al. | |
| 2004/0117627 A1 | 6/2004 | Brewington | |
| 2004/0133493 A1 | 7/2004 | Ford et al. | |
| 2004/0162833 A1 | 8/2004 | Jones et al. | |
| 2004/0181756 A1 | 9/2004 | Berringer et al. | |
| 2004/0205534 A1 | 10/2004 | Koelle | |
| 2004/0225884 A1 | 11/2004 | Lorenzini et al. | |
| 2004/0230891 A1 | 12/2004 | Pravetz et al. | |
| 2004/0250070 A1 | 12/2004 | Wong | |
| 2004/0255114 A1 | 12/2004 | Lee et al. | |
| 2004/0255127 A1 | 12/2004 | Arnouse | |
| 2005/0033811 A1 | 2/2005 | Bhogal et al. | |
| 2005/0049903 A1 | 3/2005 | Raja | |
| 2005/0076215 A1 | 4/2005 | Dryer | |
| 2005/0091143 A1 | 4/2005 | Schmidt et al. | |
| 2005/0120217 A1 | 6/2005 | Fifield et al. | |
| 2005/0165626 A1 | 7/2005 | Karpf | |
| 2005/0182684 A1 | 8/2005 | Dawson et al. | |
| 2005/0182956 A1 | 8/2005 | Ginter et al. | |

(56) References Cited

U.S. PATENT DOCUMENTS

| | | |
|---|---|---|
| 2005/0192908 A1 | 9/2005 | Jorimann et al. |
| 2005/0231738 A1 | 10/2005 | Huff et al. |
| 2006/0020592 A1 | 1/2006 | Gee et al. |
| 2006/0047600 A1 | 3/2006 | Bodenheim et al. |
| 2006/0153380 A1 | 7/2006 | Gertner |
| 2006/0161780 A1 | 7/2006 | Berryman et al. |
| 2006/0161781 A1 | 7/2006 | Rice et al. |
| 2006/0174199 A1 | 8/2006 | Soltis et al. |
| 2006/0205476 A1 | 9/2006 | Jubinville |
| 2006/0259440 A1 | 11/2006 | Leake et al. |
| 2006/0261545 A1 | 11/2006 | Rogers |
| 2006/0294152 A1 | 12/2006 | Kawabe et al. |
| 2007/0026927 A1 | 2/2007 | Yaldoo et al. |
| 2007/0061578 A1 | 3/2007 | Dhalla et al. |
| 2007/0079139 A1 | 4/2007 | Kim |
| 2007/0088958 A1 | 4/2007 | Qa'lm-Maqami |
| 2007/0118732 A1 | 5/2007 | Whitmore |
| 2007/0130186 A1 | 6/2007 | Ramsey et al. |
| 2007/0136361 A1 | 6/2007 | Lee et al. |
| 2007/0143085 A1 | 6/2007 | Kimmel |
| 2007/0165865 A1 | 7/2007 | Talvitie |
| 2007/0198533 A1 | 8/2007 | Foygel et al. |
| 2007/0208944 A1 | 9/2007 | Pavlicic |
| 2007/0220260 A1 | 9/2007 | King |
| 2007/0271592 A1 | 11/2007 | Noda et al. |
| 2007/0289022 A1 | 12/2007 | Wittkotter |
| 2008/0016357 A1 | 1/2008 | Suarez |
| 2008/0034213 A1 | 2/2008 | Boemker et al. |
| 2008/0052520 A1 | 2/2008 | Lee et al. |
| 2008/0055945 A1 | 3/2008 | Chan et al. |
| 2008/0097777 A1 | 4/2008 | Rielo |
| 2008/0141033 A1 | 6/2008 | Ginter et al. |
| 2008/0209313 A1 | 8/2008 | Gonser |
| 2008/0209516 A1 | 8/2008 | Nassiri |
| 2008/0216147 A1 | 9/2008 | Duffy |
| 2008/0235577 A1 | 9/2008 | Veluchamy et al. |
| 2008/0260287 A1 | 10/2008 | Berryman et al. |
| 2008/0301010 A1 | 12/2008 | Klim et al. |
| 2008/0307298 A1 | 12/2008 | Matveief et al. |
| 2008/0313723 A1 | 12/2008 | Naono et al. |
| 2009/0024912 A1 | 1/2009 | McCabe et al. |
| 2009/0025087 A1 | 1/2009 | Peirson, Jr. et al. |
| 2009/0044019 A1 | 2/2009 | Lee et al. |
| 2009/0083618 A1 | 3/2009 | Campbell |
| 2009/0099881 A1 | 4/2009 | Hanna et al. |
| 2009/0132351 A1 | 5/2009 | Gibson |
| 2009/0138730 A1 | 5/2009 | Cook et al. |
| 2009/0145958 A1 | 6/2009 | Stoutenburg et al. |
| 2009/0185241 A1 | 7/2009 | Nepomniachtchi |
| 2009/0268903 A1 | 10/2009 | Bojinov et al. |
| 2009/0292786 A1 | 11/2009 | McCabe et al. |
| 2010/0010660 A1 | 4/2010 | Menendez et al. |
| 2010/0088364 A1 | 4/2010 | Carter et al. |
| 2010/0122094 A1 | 5/2010 | Shima |
| 2010/0153011 A1 | 6/2010 | Obrea et al. |
| 2010/0217987 A1 | 8/2010 | Shevade |
| 2010/0235727 A1 | 9/2010 | Ashton et al. |
| 2010/0274863 A1 | 10/2010 | Foygel et al. |
| 2010/0287260 A1 | 11/2010 | Peterson et al. |
| 2010/0293094 A1 | 11/2010 | Kolkowitz et al. |
| 2011/0093769 A1 | 4/2011 | Dunn et al. |
| 2011/0093807 A1 | 4/2011 | Dunn et al. |
| 2011/0119165 A1 | 5/2011 | Zee |
| 2011/0126022 A1 | 5/2011 | Sieberer |
| 2011/0225485 A1 | 9/2011 | Schnitt |
| 2011/0238510 A1 | 9/2011 | Rowen et al. |
| 2011/0264907 A1 | 10/2011 | Betz et al. |
| 2011/0314371 A1 | 12/2011 | Peterson et al. |
| 2012/0180135 A1 | 7/2012 | Hodges et al. |
| 2012/0209970 A1 | 8/2012 | Scipioni et al. |
| 2012/0271882 A1 | 10/2012 | Sachdeva et al. |
| 2012/0304265 A1 | 11/2012 | Richter et al. |
| 2013/0019156 A1 | 1/2013 | Gonser et al. |
| 2013/0019289 A1 | 1/2013 | Gonser et al. |
| 2013/0050512 A1 | 2/2013 | Gonser et al. |
| 2013/0067243 A1 | 3/2013 | Tamayo-Rios et al. |
| 2013/0159720 A1 | 6/2013 | Gonser et al. |
| 2013/0179676 A1 | 6/2013 | Hamid |
| 2013/0254111 A1 | 9/2013 | Gonser et al. |
| 2013/0263283 A1 | 10/2013 | Peterson et al. |
| 2014/0019761 A1 | 1/2014 | Shapiro |
| 2017/0161375 A1* | 6/2017 | Stoica .................. G06F 16/353 |
| 2020/0012772 A1* | 1/2020 | Cho .................... G06F 21/6245 |
| 2020/0327172 A1* | 10/2020 | Coquard ............. G06F 16/9035 |
| 2022/0156491 A1 | 5/2022 | Semenov et al. |
| 2022/0236843 A1 | 7/2022 | Wilde et al. |
| 2023/0064367 A1* | 3/2023 | Satish .................... G06N 20/00 |
| 2023/0066143 A1 | 3/2023 | Matei et al. |
| 2023/0109761 A1* | 4/2023 | Hatter .................. H04L 9/3255 |
| | | 705/44 |
| 2023/0134989 A1 | 5/2023 | Hron, II et al. |

FOREIGN PATENT DOCUMENTS

| | | |
|---|---|---|
| CN | 101299256 A | 11/2008 |
| CN | 101395599 A | 3/2009 |
| CN | 103959281 A | 7/2014 |
| EP | 1238321 A1 | 9/2002 |
| JP | 2000048072 A | 2/2000 |
| JP | 2003271529 A | 9/2003 |
| JP | 2004246903 A | 9/2004 |
| JP | 2005267438 A | 9/2005 |
| JP | 2008117258 A | 5/2008 |
| JP | 2008225527 A | 9/2008 |
| KR | 20000049674 A | 8/2000 |
| KR | 20020092595 A | 12/2002 |
| KR | 20070059931 A | 6/2007 |
| KR | 100929488 B1 | 12/2009 |
| KR | 20090122657 A | 12/2009 |
| RU | 2291491 C2 | 1/2007 |
| RU | 2300844 C2 | 6/2007 |
| RU | 2400811 C2 | 9/2010 |
| WO | 1996007156 A1 | 3/1996 |
| WO | 01042885 A1 | 6/2001 |
| WO | 2003091834 A2 | 11/2003 |
| WO | 2007075235 A1 | 7/2007 |
| WO | 2008124627 A1 | 10/2008 |
| WO | 2009012478 A3 | 4/2009 |
| WO | 2010105262 A1 | 9/2010 |
| WO | 2010151630 A2 | 12/2010 |
| WO | 2013010174 A3 | 3/2013 |

OTHER PUBLICATIONS

Brown, "Digital Signatures: Can They Be Accepted as Legal Signatures in EID?", Proceedings of the 1st ACM Conference on Computer and Communications Security, Dec. 1, 1993, pp. 86-92, URL: https://dl.acm.org/doi/pdf/10.1145/168588.168598.

Harold, "XML Bible", IDG Books Worldwide, Inc., vol. 136, Mar. 1, 2004, 996 pp., URL: http://103.62.146.201:8081/xmlui/bitstream/handle/1/5656/XMLBible.pdf?sequence=1.

Kamara et al., "Cryptographic Cloud Storage", ResearchGate, Springer, Jan. 25, 2010, 15 pp., URL: https://www.researchgate.net/publication/220796939_Cryptographic_Cloud_Storage.

Kwok et al., "An Automatic Electronic Contract Document Signing System in a Secure Environment", Seventh IEEE International Conference on E-Commerce Technology, IEEE, Feb. 23, 2005, 7 pp., URL: https://dominoweb.draco.res.ibm.com/reports/RC23535.pdf.

Laurens Leurs, "The history of PDF", Prepressure, Feb. 14, 2010, 15 pp., URL: https://www.prepressure.com/pdf/basics/history.

Su et al., "Signature-In-Signature Verification via a Secure Simple Network Protocol", 2010 International Conference on Computational Intelligence and Software Engineering, IEEE, Dec. 10, 2010, 4 pp., URL: http://people.vcu.edu/~lim4/sis.pdf.

Zefferer et al., "An Electronic-signature Based Circular Resolution Database System", Institute for Applied Information Processing and Communications (IAIK), Mar. 22, 2010, 24 pp., URL: https://pdfs.semanticscholar.org/7279/elf0413e8314870ab849d03e95c35bc6688b.pdf.

(56) References Cited

OTHER PUBLICATIONS

Elynx, "elynx Adds Workflow Management to Electronic Document Platform—new Workflow Capabilities Provide for Enhanced Electronic Loan Processing", Jan. 20, 2009, 2 pp.

Herzberg et al., "Surf'N'Sign: Client Signatures on Web Documents", IBM Systems Journal, vol. 37, No. 1, IEEE, Jan. 1, 1998, pp. 61-71.

Wheeler et al., "DocuSign Unveils new Scalable Product and Support Offerings of Electronic Signature and Electronic Contract Execution", DocuSign, Jan. 28, 2009, 1 pp.

International Search Report and Written Opinion of International Application No. PCT/US2024/031083 dated Jul. 23, 2024, 11 pp.

* cited by examiner

FIG. 3B

Select envelopes to put into a new cotainer

These envelopes were found to be correlated to the envelope you just sent.

| ENVELOPE NAME | RECIPIENT | SENT DATE | SIMILARITY SCORE |
|---|---|---|---|
| Contract A | Sarah Connor, +2 more | Today | 95% |
| Contract B | Sarah Connor | 2 Weeks Ago | 92% |
| Contract C | Sarah Connor | 3 Weeks Ago | 89% |
| Contract D | Sarah Connor | 1 Month Ago | 83% |
| Contract E | Sarah Connor | July 22, 2022 | 76% |
| Contract F | Sarah Connor | July 22, 2022 | 72% |
| Contract G | Sarah Connor | July 22, 2022 | 67% |
| Contract H | Sarah Connor | | 66% |
| Contract I | Sarah Connor | | 62% |

FIND MORE

FIG. 3D

DOCUMENT CONTAINER WITH CANDIDATE DOCUMENTS

TECHNICAL FIELD

This disclosure relates generally to electronic document management.

BACKGROUND

Document management systems manage electronic documents for various entities, such as, for example, people, companies, or organizations. Such electronic documents may include various types of agreements that can be executed (e.g., electronically signed) by entities, such as non-disclosure agreements, indemnity agreements, purchase orders, lease agreements, employment contracts, and the like. Document management systems may employ techniques to streamline document generation.

SUMMARY

Aspects of the present disclosure describe techniques for suggesting one or more candidate documents for a document container for an electronic document. In general, a document management platform may detect attributes for an input document, such as recipient of the input document, subject matter of the input document, or specific data fields of the input document. In this example, the document management platform may use a machine learning model to identify candidate documents with related attributes. The document management platform may use the machine learning model to assign the candidate documents a similarity score based on a determined relatedness of the candidate documents and the input document. For example, the document management platform may use the machine learning model that implements various clustering algorithms to group the input documents and candidate documents into clusters. The document management platform may assign a similarity score to each candidate document based on how close the candidate document is to the input document within each cluster.

The document management platform may generate data of a graphical user interface (GUI) that indicates at least a subset of candidate documents. For example, the document management platform may select which candidate documents are related documents based on one or more similarity score thresholds. For instance, the document management platform may suggest documents that satisfy a similarity score threshold. In some instances, a user interacting with the GUI may select which candidate documents are related documents. Responsive to determining which candidate documents are related documents, the document management platform may generate a container that includes the selected candidate documents. For example, the document management platform may generate a container that includes the input document, the related documents, and one or more fields shared by the input documents and one or more related documents. In this way, a sender of the input document may use the related documents to automatically fill fields of the input document.

The techniques described herein may provide one or more technical advantages that realize one or more practical applications. For example, by using a machine learning model to determine a relatedness of electronic documents, the document management platform may identify more documents to include in a container for an electronic document compared to systems that omit using the machine learning model. Moreover, the techniques described herein for implementing the machine learning model (e.g., input data and/or training) may further increase an accuracy of the determining a relatedness of documents. Including more documents in the container may help to improve a user experience by recommending common fields to automatically fill out electronic documents, which may help to reduce errors in the fields and/or reduce the time that electronic documents are processed by the document management platform.

In one example, a system comprises one or more processors having access to a memory. The one or more processors may be configured to determine an attribute for an input document for execution by a signer. The one or more processors may be further configured to generate a similarity score for each of a plurality of candidate documents using a machine learning model, wherein using the machine learning model comprises providing the attribute as an input to the machine learning model. The one or more processors may be further configured to generate data for a graphical user interface comprising an indication of at least a subset of the candidate documents based on the similarity scores generated for each of the plurality of candidate documents. The one or more processors may be further configured to output, for display, the data to a user device.

In another example, a method may include determining an attribute for an input document for execution by a signer. The method may further include generating a similarity score for each of a plurality of candidate documents using a machine learning model, wherein using the machine learning model comprises providing the attribute as an input to the machine learning model. The method may further include generating data for a graphical user interface comprising an indication of at least a subset of the candidate documents based on the similarity scores generated for each of the plurality of candidate documents. The method may further include outputting, for display, the data to a user device.

In yet another example, a computer-readable storage medium encoded with instructions that, when executed, causes at least one processor of a computing device to determine an attribute for an input document for execution by a signer. The instructions may further cause at least one processor to generate a similarity score for each of a plurality of candidate documents using a machine learning model, wherein using the machine learning model comprises providing the attribute as an input to the machine learning model. The instructions may further cause the at least one processor to generate data for a graphical user interface comprising an indication of at least a subset of the candidate documents based on the similarity scores generated for each of the plurality of candidate documents. The instructions may further cause the at least one processor to output, for display, the data to a user device.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF THE DRAWINGS

FIGS. 3A-3G are conceptual diagrams illustrating example graphical user interfaces for generating containers, in accordance with one or more techniques of this disclosure.

Like reference characters denote like elements throughout the text and figures.

DETAILED DESCRIPTION

Figure 1:
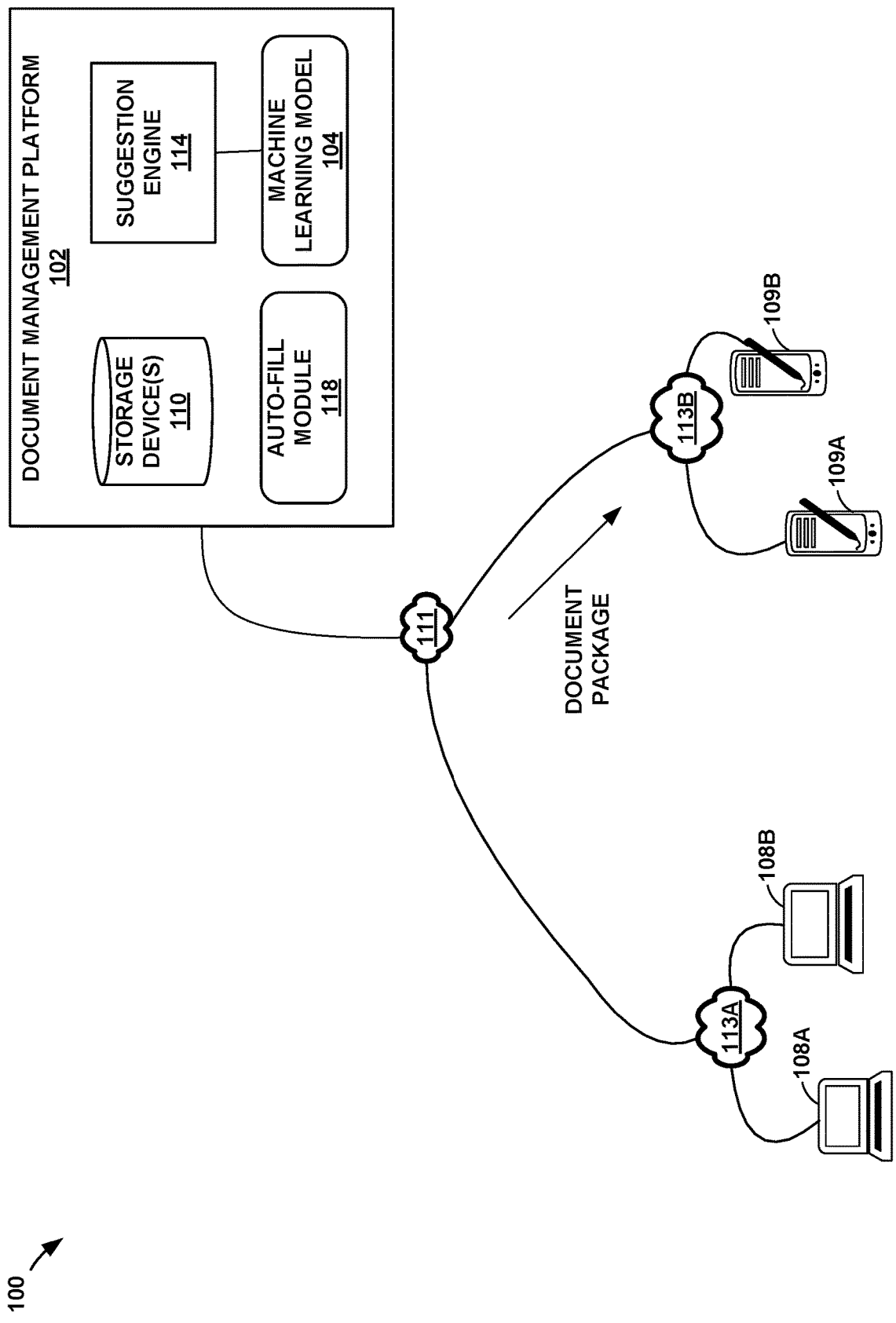
FIG. 1 is a block diagram illustrating an example system that generates containers of related documents, in accordance with the techniques of this disclosure.

FIG. 1 is a block diagram illustrating an example system 100 that generates containers of related documents, in accordance with the techniques of this disclosure. In the example of FIG. 1, system 100 includes a centralized document management platform 102 that provides storage and management of documents or document packages for various users. For example, document management platform 102 may provide storage and management of documents or document packages for users associated with sender device 108A and sender device 108B via network 111 and network 113A. In another example, document management platform 102 may provide storage and management of documents or document packages for users associated with signer device 109A and signer device 109B via network 111 and network 113B. Document management platform 102 may include a collection of hardware devices, software components, and/or data stores that can be used to implement one or more applications or services provided to one or more sender devices 108 and one or more signer devices 109 via network 113. Document management platform 102 may be configured to allow a sender to create and send documents to one or more recipients for negotiation, collaborative editing, electronic execution (e.g., electronic signature), automation of contract fulfillment, archival, and analysis, among other tasks. For example, a user of sender device 108A and/or sender device 108B (collectively referred to herein as sender device 108) may be a sender of a document package (e.g., envelope) and a user of signer device 109A and/or signer device 109B (collectively referred to herein as signer device 109) may be a recipient of the document package. Document packages may also be referred to herein as envelopes. Using signer device 108, the signer may review content or terms presented in an electronic document, and in response to agreeing to the content or terms, can electronically execute the document. In some aspects, in advance of the execution of the document, the sender may generate, using sender device 108, the document package to provide to the one or more signers. The document package may include at least one document to be and information for one or more signers (e.g., email information and a name for each signer). In some examples, the document package may also include one or more permissions defining actions the one or more recipients can perform in association with the document package. In some examples, the document package may also identify tasks the one or more signers are to perform in association with the document package.

Document management platform 102 may be implemented within a centralized document system, an online document system, a document management system, or any type of digital management platform. Example environments for document management platform 102 may include, but are not limited to online signature systems, online document creation and management systems, collaborative document and workspace systems, online workflow management systems, multi-party communication and interaction platforms, social networking systems, marketplace and financial transaction management systems, or any suitable digital transaction management platform.

Document management platform 102 may be located on premises and/or in one or more data centers, with each data center a part of a public, private, or hybrid cloud. The applications or services may be distributed applications. The applications or services may support enterprise software, financial software, office or other productivity software, data analysis software, customer relationship management, web services, educational software, database software, multimedia software, information technology, healthcare software, or other types of applications or services. The applications or services may be provided as a service (-aaS) for Software-aaS, Platform-aaS, Infrastructure-aaS, Data Storage-aas (dSaaS), or other type of service.

In the example of FIG. 1, document management platform 102 may allow sender device 108 and signer device 109 to access documents, via network 111 using a communication protocol, as if such document was stored locally (e.g., to a hard disk of a corresponding device 108, 109). Example communication protocols for accessing documents and objects may include, but are not limited to, Server Message Block (SMB), Network File System (NFS), or AMAZON Simple Storage Service (S3).

Document management platform 102 may be configured to generate a container and store the container on one or more storage devices 110 (also referred to herein as simply storage device 110). Storage device 110 may represent one or more physical or virtual computer and/or storage devices that include or otherwise have access to storage media. Such storage media may include one or more of Flash drives, solid state drives (SSDs), hard disk drives (HDDs), forms of electrically programmable memories (EPROM) or electrically erasable and programmable (EEPROM) memories, and/or other types of storage media used to support the document management platform 102. In some examples, document management platform 102 may communicate with user devices (e.g., sender device 108A, 108B or the signer device 109A, 109B) over network 111, network 113A, and/or network 113B to receive instructions and send document packages (or other information).

Each of networks 113A and 113B and network 111 may include the Internet and/or may include or represent any public or private communications network or other network. For instance, networks 113 may be a cellular network, Wi-Fi®, ZigBee®, Bluetooth®, Near-Field Communication (NFC), satellite, enterprise, service provider, and/or other type of network enabling transfer of data between computing systems, servers, computing devices, and/or storage devices. One or more of such devices may transmit and receive data, commands, control signals, and/or other information across network 113 or network 111 using any suitable communication techniques. Each of network 113 or network 111 may include one or more network hubs, network switches, network routers, satellite dishes, or any other network equipment. Such network devices or components may be operatively inter-coupled, thereby providing for the exchange of information between computers, devices, or other components (e.g., between one or more client devices or systems and one or more computer/server/storage devices or systems). Each of the devices or systems illustrated in FIG. 1 may be operatively coupled to network 113 and/or network 111 using one or more network links. The links coupling such devices or systems to network 113 and/or network 111 may be Ethernet, Asynchronous Transfer Mode (ATM) or other types of network connections, and such connections may be wireless and/or wired connections. One or more of the devices or systems illustrated in FIG. 1 or otherwise on network 113 and/or network 111 may be in a remote location relative to one or more other illustrated devices or systems.

Data exchanged over the network 113 and/or network 111 may be represented using any suitable format, such as hypertext markup language (HTML), extensible markup language (XML), or JavaScript Object Notation (JSON). In some aspects, the network 113 and/or network 111 may include encryption capabilities to ensure the security of documents. For example, encryption technologies may include secure sockets layers (SSL), transport layer security (TLS), virtual private networks (VPNs), and Internet Protocol security (IPsec), among others.

Examples of devices 108 and devices 109 may include, but are not limited to, portable, mobile, or other devices, such as mobile phones (including smartphones), wearable computing devices (e.g., smart watches, smart glasses, etc.) laptop computers, desktop computers, tablet computers, smart television platforms, server computers, mainframes, infotainment systems (e.g., vehicle head units), etc. In some examples, devices 108 and devices 109 may represent a cloud computing system that provides one or more services via a network. That is, in some examples, devices 108 and devices 109 may be a distributed computing system.

In an example, a user of a computing device (e.g., the sender device 108A, 108B or the signer device 109A, 109B) may represent an individual user, group, organization, or company that is able to interact with document packages (or other content) generated on or managed by the document management platform 102. Each user may be associated with a username, email address, full or partial legal name, or other identifier that may be used by the document management platform 102 to identify the user and to control the ability of the user to view, modify, execute, or otherwise interact with document packages managed by the document management platform 102. In some aspects, users may interact with the document management platform 102 through a user account with the document management platform 102 and one or more user devices accessible to that user. In situations in which document management platform 102 stores and uses information of users operating devices 108 and devices 109, document management platform 102 may request explicit permission from the users prior to storing and using any personally identifiable information of the users.

In accordance with the techniques described herein, document management platform 102 may use machine learning model 104 to identify candidate documents that may be potentially related to a received input document. Document management platform 102 may receive the input document from sender device 108B, for example, responsive to the user associated with sender device 108B providing document management platform 102 explicit consent to analyze the input document. Suggestion engine 114 of document management platform 102 may suggest which of the candidate documents are similar or related based on generated similarity scores. Suggestion engine 114 may use machine learning model 104 to assign each candidate document a similarity score. Suggestion engine 114 may select which candidate documents are related documents based on a similarity score threshold.

Suggestion engine 114 may generate data for a graphical user interface (GUI) that may include one or more candidate documents and a corresponding similarity score. Suggestion engine 114 may output the data for the GUI to sender device 108B, for example, to allow a user of sender device 108B to select which candidate documents should be considered related documents. Suggestion engine 114 may receive a signal from sender device 108B indicating which candidate documents are related documents. Responsive to suggestion engine 114 receiving the signal from sender device 108B indicating which candidate documents are related documents, suggestion engine 114 may select the identified related documents.

Suggestion engine 114 may send the selected related documents to document management platform 102. Document management platform 102 may generate a container that includes the input document and at least one related document. Document management platform 102 may send the generated container to auto-fill module 118. Auto-fill module 118 may compare one or more fields of the related documents to one or more fields of the input document to determine one or more common fields shared by the input document and a set of related documents of the plurality of documents.

Document management platform 102 may apply the determined one or more common fields to automatically complete fields of electronic documents. For example, document management platform 102 may receive an input document as a document package (e.g., envelope) from sender device 108B. Document management platform 102 may determine one or more attributes for the input document for execution by a signer (e.g., a user operating signer device 109B). Examples of attributes may include, but are not limited to, for example, one or more of a sender user identifier (ID), an envelope ID, an envelope sent timestamp, a recipient 1 user ID, a recipient 2 user ID, a recipient X user ID, a recipient 1 sign date, a recipient 2 sign date, a recipient X sign date, a recipient 1 location, a recipient 2 location, or a recipient X location. Document management platform 102 may provide the determined one or more attributes for the input document as an input to machine learning model 104 to generate a similarity score for one or more candidate documents. Examples of machine learning models trained to determine similarity scores for candidate documents are described in detail below, for example, with reference to FIG. 4 and elsewhere.

Document management platform 102 may generate data for a GUI including an indication of at least one candidate document based on a similarity score generated for each of the plurality of candidate documents. For example, suggestion engine 114 of document management platform 102 may determine a similarity score for each candidate document and determine which candidate document to include in the data for the GUI based on a similarity score threshold. Document management platform 102 may output, for display, the data for the GUI to a user device (e.g., sender device 108B). In some examples, suggestion engine 114 of document management platform 102 may receive a signal from the user device indicating which candidate documents are related documents. In some examples, suggestion engine 114 may select one or more candidate documents from the subset of candidate documents as related documents. Suggestion engine 114 may select the one or more related documents based on the similarity score generated for each of the plurality of candidate documents.

Document management platform 102 may receive the input document and the one or more related documents from suggestion engine 114. Document management platform 102 may generate a container including the input document and the one or more related documents. Document management platform 102 may store the container in storage devices 110. In some examples, auto-fill module 118 may identify common fields shared by the input document and the one or more related documents. For example, auto-fill module 118 may identify a common field associated with a field of the input document that may be identical to a field of a related document. Auto-fill module 118 may update the container stored in storage devices 110 with the identified common fields.

Auto-fill module 118 may generate data for the GUI including one or more common fields shared by the input document and the one or more related documents. Auto-fill module 118 may output the data for the GUI to sender device 108B, for example. Auto-fill module 118 may receive a signal from sender device 108B approving, changing, or adding common fields. Auto-fill module 118 may update the container stored in storage devices 110 based on the signal received from sender device 108B. Auto-fill module 118 may allow users operating devices 108 and devices 109 to use the updated containers to automatically fill fields of electronic documents based on the one or more common fields included in the container. In this way, document management platform 102 may help to improve a user's experience in creating and managing documents.

In operation, document management platform 102 may identify candidate documents responsive to receiving an input document. Document management platform 102 may receive the input document and initiate identifying related documents only after receiving explicit consent from an owner of the input document. Document management platform 102 may also identify candidate documents from a set of documents, in which the owner of the set of documents has explicitly granted permission for document management platform 102 to store and use. Document management platform 102 may only access electronic documents according to privacy settings established by user devices using document management platform 102. In this way, document management platform 102 may maintain confidentiality of a user's ownership over electronic documents.

Document management platform 102 may receive the input document as a document package (e.g., an envelope). A document package or envelope may be a set of electronic documents including information or references to contact information for signers of one or more electronic documents within the document package or envelope. Document management platform 102 may determine one or more attributes for the input document. In some examples, document management platform 102 may obtain a document package (e.g., envelope) comprising the input document and the attribute. Document management platform 102 may determine one or more attributes for the input document including contact information of the recipient or signers of the input document (electronic mailing address, postal address, name of the recipient, etc.), the name of the input document or names of files included in the input document (e.g., when the input document is an envelope), the document type of the input document or the file types of files included in the input document, sets of fields within the input document or sets of fields within files included in the input document, etc. For example, document management platform 102 may determine the attribute for the input document based on content of the input document (e.g., text of the input document, sections included in the input document, etc.). Document management platform 102 may also determine the attribute for the input document based on one or more signers (e.g., contractual parties of a transaction involving the input document) identified in the input document. Document management platform 102 may determine the attribute for the input document based on a subject matter of the input document (e.g., real estate transaction, employment contracts, etc.). The input document may indicate a subject matter based on information included in the document, such as title of the input document, content of the input document, keywords included in the input document, and/or themes of the input document. Document management platform 102 may determine the attribute for the input document based on a prompt (e.g., buyer name) and tag (e.g., "Sarah Connor") of one or more fields included in the input document.

Document management platform 102 may identify candidate documents based on whether a candidate document includes one or more determined attributes. In some examples, document management platform 102 may identify candidate documents that are accessible to users operating either sender devices 108 or signer devices 109. Document management platform 102 may also identify candidate documents that may be stored as document packages (e.g., envelopes, a set of documents, etc.). For example, document management platform 102 may obtain the input document. Document management platform 102 may identify candidate documents that are accessible to a user of sender device 108B. Document management platform 102 may use and access documents associated with a user account associated with the user of sender device 108.

Document management platform 102 may apply machine learning model 104 to identify candidate documents. Machine learning model 104 may include, for example, a discriminative machine learning model that may either be supervised and/or unsupervised. Machine learning model 104 may apply ensemble clustering. In some examples, machine learning model 104 may apply more than one (e.g., ensemble) of unsupervised cluster algorithms (KMeans, KPrototypes, Spectral Clustering, Density-based Clustering, Hierarchical Clustering, etc.) to identify candidate documents. Machine learning model 104 may be trained with synthetic electronic documents to learn how to appropriately group electronic documents based on attributes. As noted above, document management platform 102 may process documents according to user privacy. For example, machine learning model 104 may receive explicit consent from a particular sender of device 108B to train machine learning model 104 with electronic documents accessible to the particular sender. Machine learning model 104 may only process training documents (e.g., not generated by any sender) and documents generated by the particular sender that have been explicitly approved by the particular sender for use by machine learning model 104.

Document management platform 102 may send the candidate documents to suggestion engine 114 to determine a relatedness of the input document to each candidate document. Suggestion engine 114 may generate a similarity score for each of the plurality of candidate documents identified. Suggestion engine 114 may use machine learning model 104 to generate the similarity score for each of the plurality of candidate documents identified. In some instances, suggestion engine 114 may select which candidate documents are related documents based on a similarity score threshold. For example, suggestion engine 114 may select a candidate document as a related document responsive to a similarity score of the candidate document satisfying a minimum similarity score threshold (e.g., a preconfigured minimum similarity score).

In some instances, suggestion engine 114 may generate data for a GUI that indicates at least one of the candidate documents and the corresponding similarity scores. Suggestion engine 114 may determine which of the candidate documents to include in the subset of candidate documents based on the similarity score determined for each of the candidate documents. Suggestion engine 114 may send the data for the GUI to sender device 108B, for example, via network 111. Suggestion engine 114 may receive a signal from device 108B that indicates at least a subset of the candidate documents. Suggestion engine 114 may process the signal from device 108B by selecting the indicated candidate documents as related documents. Suggestion engine 114 may send the related documents to document management platform 102.

In the example of FIG. 1, document management platform 102 may generate a container that includes the input document and at least one selected related document. Containers may generally include electronic documents, electronic document packages, etc. and common fields shared by at least two electronic documents in a particular container. Containers may provide users interacting with document management platform with a workspace to organize common electronic documents and streamline electronic document generation. Document management platform 102 may generate containers for users of devices 108 and devices 109. Document management platform 102 may store the container in storage devices 110 in which users of devices 108 and devices 109 may access. Auto-fill module 118 may update the container stored in storage devices 110 with common fields shared by the input document and at least one related document. For example, auto-fill module 118 may update the container with common fields determined by identifying shared values of fields within the input document and at least one related document. In this way, document management platform 102 may help to allow users of devices 108 and devices 109 to automatically complete fields of electronic documents based on the container. Document management platform 102 thereby may help to streamline electronic document generation and/or reduce the potential for human error by, for example, automatically filling electronic documents with values of common fields stored in the container.

Although suggestion engine 114, machine learning model 104, storage devices 110, and auto-fill module 118 are depicted in FIG. 1 as internal to document management platform 102 in FIG. 1, any of these components may be external to document management platform 102. For example, machine learning model 104 may be hosted by a computing device or computing system connected to document management platform 102 via a network.

Figure 2:
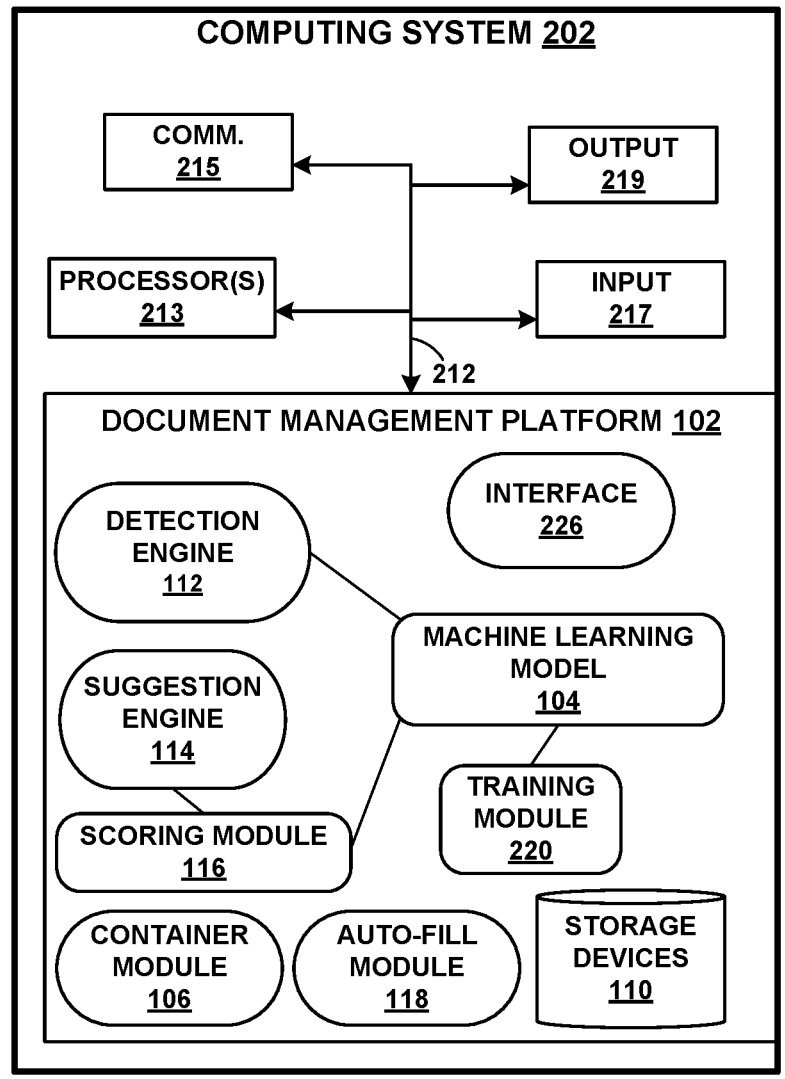
FIG. 2 is a block diagram illustrating an example system, in accordance with techniques of this disclosure.

FIG. 2 is a block diagram illustrating example system 200, in accordance with techniques of this disclosure. System 200 of FIG. 2 may be described as an example or alternate implementation of system 100 of FIG. 1. One or more aspects of FIG. 2 may be described herein within the context of FIG. 1.

In the example of FIG. 2, system 200 includes document management platform 102 implemented by computing system 202. In FIG. 2, document management platform 102 may correspond to the document management platform 102 of FIG. 1.

Computing system 202 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 202 represents a cloud computing system, server farm, and/or server cluster (or portion thereof) that provides services to other devices or systems. Computing system 202 may represent or be implemented through one or more virtualized computer instances (e.g., virtual machines, containers) of a cloud computing system, server farm, data center, and/or server cluster.

In the example of FIG. 2, computing system 202 may include one or more communication units 215, one or more input devices 217, one or more output devices 219, and the document management platform 102. Document management platform 102 may include interface module 226, detection engine 112, suggestion engine 114, scoring module 116, container module 106, auto-fill module 118, machine learning model 104, training module 220, and storage devices 110. One or more of the devices, modules, storage areas, or other components of computing system 202 may be interconnected to enable inter-component communications (e.g., physically, communicatively, and/or operatively). In some examples, such connectivity may be provided by communication channels (e.g., communication channels 212), which may represent one or more of a system bus, a network connection, an inter-process communication data structure, or any other method for communicating data.

One or more processors 213 of computing system 202 may implement functionality and/or execute instructions associated with computing system 202 or associated with one or more modules illustrated herein and/or described below. One or more processors 213 may be, may be part of, and/or may include processing circuitry that performs operations in accordance with one or more aspects of the present disclosure. Examples of processors 213 include microprocessors, application processors, display controllers, auxiliary processors, one or more sensor hubs, and any other hardware configured to function as a processor, a processing unit, or a processing device. Computing system 202 may use one or more processors 213 to perform operations in accordance with one or more aspects of the present disclosure using software, hardware, firmware, or a mixture of hardware, software, and firmware residing in and/or executing at computing system 202.

One or more communication units 215 of computing system 202 may communicate with devices external to computing system 202 by transmitting and/or receiving data, and may operate, in some respects, as both an input device and an output device. In some examples, communication units 215 may communicate with other devices over a network. In other examples, communication units 215 may send and/or receive radio signals on a radio network such as a cellular radio network. In other examples, communication units 215 of computing system 202 may transmit and/or receive satellite signals on a satellite network. Examples of communication units 215 include, but are not limited to, a network interface card (e.g., such as an Ethernet card), an optical transceiver, a radio frequency transceiver, a GPS receiver, or any other type of device that can send and/or receive information. Other examples of communication units 215 may include devices capable of communicating over Bluetooth®, GPS, NFC, ZigBee®, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth®, NFC, or other technologies or protocols.

One or more input devices 217 may represent any input devices of computing system 202 not otherwise separately described herein. Input devices 217 may generate, receive, and/or process input. For example, one or more input devices 217 may generate or receive input from a network, a user input device, or any other type of device for detecting input from a human or machine.

One or more output devices 219 may represent any output devices of computing system 202 not otherwise separately described herein. Output devices 219 may generate, present, and/or process output. For example, one or more output devices 219 may generate, present, and/or process output in any form. Output devices 219 may include one or more universal serial bus (USB) interfaces, video and/or audio output interfaces, or any other type of device capable of generating tactile, audio, visual, video, electrical, or other output. Some devices may serve as both input and output devices. For example, a communication device may both send and receive data to and from other systems or devices over a network.

One or more processors 213 may provide an operating environment or platform for various modules described herein, which may be implemented as software, but may in some examples include any combination of hardware, firmware, and software. One or more processors 213 may execute instructions of one or more modules. Processors 213 may retrieve, store, and/or execute the instructions and/or data of one or more applications, modules, or software. Processors 213 may also be operably coupled to one or more other software and/or hardware components, including, but not limited to, one or more of the components of computing system 202 and/or one or more devices or systems illustrated as being connected to computing system 202.

Document management platform 102 may perform functions relating to storage and management of documents or document packages (e.g., envelopes) for various users, as described above with respect to FIG. 1. Detection engine 112 may use machine learning model 104 to determine one or more candidate documents that are potentially related to an input document received by document management platform 102. Suggestion engine 114 may use machine learning model 104 to determine a similarity score for each candidate document. Suggestion engine 114 may also select which candidate documents are related documents. Container module 106 may generate a container that includes the input document and at least one related document. Container module 106 may associate the input document with at least one related document as having at least one common field (e.g., the same tag value for a corresponding prompt). Auto-fill module 118 may identify common fields shared by the input document and at least one related document by comparing tag/pair combinations of fields included in the input document and fields included in the related documents. Auto-fill module 118 may identify a common field, for example, if a field of the input document has the same tag and corresponding prompt as a field of a corresponding document. Auto-fill module 118 may update the container with the identified common fields.

In some examples, a user of sender device 108B may create a document package (e.g., envelope) via the document management platform 102. Sender device 108B may create a document package that includes the input document and at least one attribute for the input document. Document management platform 102 may send the document package for review and execution by the user of signer device 109B. The user of the signer device 109B may be associated with an email address provided by the user of the sender device 108B. In this example, document management platform 102 requests explicit permission from users of devices 108 and devices 109 to use or collect user information. For instance, while document management platform 102 may have access to documents for different senders, a specific sender may only have access to documents generated by the specific sender. That is, document management platform 102 may suggest documents to include in a container that are accessible to the specific sender and not any documents generated or restricted by other senders or users of document management platform 102.

In accordance with the techniques of this disclosure, computing system 202 may receive an input document for a user device (e.g., sender device 108B of FIG. 1). Computing system 202 may receive the input document via input devices 217 or communication units 215. Computing system 202 may only receive the input document from the user device after the user of the user device provides explicit consent to computing system 202. Responsive to receiving explicit consent from the user, computing system 202 may process the input document.

Detection engine 112 of document management platform 102 may identify candidate documents that may be potentially related to the input document. Detection engine 112 may determine one or more attributes for the input document. In some instances, detection engine 112 may provide the determined attributes for the input document to machine learning model 104 to identify the candidate documents.

In some instances, prior to receiving the input document, detection engine 112 may use machine learning model 104 to group a set of electronic documents into clusters. Machine learning model 104 may apply any type of clustering algorithm to group electronic documents into clusters based on attributes for the electronic documents. Machine learning model 104 may generate clusters for electronic documents in which document management platform 102 has been given explicit permission to access and use. In response to receiving the input document, detection engine 112 may use machine learning model 104 to assign the input document to one or more generated clusters based on the determined attributes for the input document. Detection engine 112 may identify the candidate documents based on which electronic documents are within the same cluster the input document was assigned to. Detection engine 112 may also identify candidate documents based on a distance metric associated with how far an electronic document is from the input document within a given cluster the input document was assigned to.

In response to receiving explicit consent from users of devices 108 and devices 109, detection engine 112 may use machine learning model 104 to group all documents accessible to users of devices 108 and devices 109 into clusters based on the similarity of data points (e.g., attributes). Machine learning model 104 may be trained on how to map electronic documents into clusters based on synthetic data stored in storage devices 110. Detection engine 112 may use machine learning model 104 to generate a plurality of mappings or clusters for each cluster algorithm machine learning model 104 applies. Responsive to detection engine 112 receiving the input document, detection engine 112 may use machine learning model 104 to apply the same clustering algorithms to the input document. For each cluster algorithm, detection engine 112 may use machine learning model 104 to map the input document to a cluster. In some instances, detection engine 112 may use machine learning model 104 to identify candidate documents based on the documents within the same clusters the input document was assigned to. Detection engine 112 may also use machine learning model 104 that applies generative machine learning model techniques (e.g., neural networks) to generate candidate documents that may not have been previously accessible to users of devices 108 and devices 109.

In some examples, machine learning model 104 may be trained to group electronic documents into clusters based on one or more attributes for the electronic documents using training module 220. Training module 220 may use synthetic electronic documents with known attributes and similarity scores to train machine learning model 104. In some instances, document management platform 102 may be granted explicit permission from an owner of electronic documents to use the owner's electronic documents to train machine learning model 104.

In response to detection engine 112 identifying at least one candidate document, suggestion engine 114 of document management platform 102 may select which candidate documents are related documents. In some instances, suggestion engine 114 may select the related documents based on similarity scores determined for each candidate document.

Scoring module 116 may determine a similarity score for each candidate document using machine learning model 104. Scoring module 116 may determine a similarity score for a candidate document based on a weight applied to a measure distance the candidate document is to the input document within a cluster.

Suggestion engine 114 may generate data for a GUI indicating at least one candidate document and associated similarity scores. Suggestion engine 114 may send a signal with the data for the GUI to a user device (e.g., sender device 108B of FIG. 1) via output devices 219 or communication units 215. In some examples, suggestion engine 114 may receive a signal from the user device via input devices 217 or communication units 215. Suggestion engine 114 may receive a signal from the user device indicating which of the candidate documents are related to the input document. Suggestion engine 114 may select candidate documents included in the signals as related documents. In some instances, suggestion engine 114 may send the indication of which of the candidate documents are related to training module 220. Machine learning model 104 may adjust one or more weights used to determine a similarity score of a candidate document based on feedback received from the indications provided by the user device.

Container module 106 may generate a container that includes the input document and at least selected related document. Container module 106 may store the container in storage devices 110. In some instances, auto-fill module 118 may update the container with common fields shared by any combination of electronic documents included in the container. Auto-fill module 118 may determine a common field by comparing values of fields of any combination of electronic documents included in the container. In some instances, auto-fill module 118 may generate data for the GUI indicating the one or more common fields. Auto-fill module 118 may output the data to a user device (e.g., sender device 108B of FIG. 1) via output devices 219 or communication units 215. Auto-fill module 118 may receive a signal, via input devices 217 or communication units 215, indicating whether the user of the user device has approved, modified, added, or deleted the one or more common fields. Auto-fill module 118 may update the container according to the user input confirming which common fields should be automatically filled out for documents within the container. In this way, document management platform 102 allows users to make bulk changes to field values for all documents within a container.

Document management platform 102 may also allow users to use the updated container to automatically fill out subsequent electronic documents. In response to receiving explicit consent of a user operating a user device, detection engine 112 of document management platform 102 may monitor an electronic document newly created on one or more user devices (e.g., devices 108 and/or devices 109). Detection engine 112 may use machine learning model 104 to determine whether the newly created document is related to one or more documents in the container. Detection engine 112 may, for example, receive the newly created document as an input document. Detection engine 112 may send a signal to the user requesting whether the newly created input document should be included in the container. In response to receiving a signal indicating that the newly created input document should be included in the container, container module 106 may add the newly created input document to the container. In some instances, auto-fill module 118 may populate fields within the newly input created document with the values of the common fields specified in the container. In this way, document management platform 102 may help to streamline electronic document generation by automatically filling out newly created electronic documents.

In some instances, detection engine 112 may recommend documents to include in a container based on one or more similar containers. In such instances, detection engine 112 may use machine learning model 104 to determine whether the container is related to other containers. Suggestion engine 114 may select one or more related containers. Suggestion engine 114 may generate data for the GUI indicating one or more documents included in the related container that are not included in the container. Document management platform 102 may send the data for the GUI to a user device (e.g., sender device 108B of FIG. 1). Document management platform 102 may receive a signal from the user device indicating which, if any, documents from the related container should be included in the container. Container module 106 may add the selected documents to the container.

FIGS. 3A-3G are conceptual diagrams illustrating example graphical user interfaces for generating containers, in accordance with one or more techniques of this disclosure. The example of FIGS. 3A-3G is described below within the context of FIGS. 1 and 2 for example purposes only. As shown in FIGS. 3A-3G, GUIs 330A-330G may include graphical elements that may allow a user to input data to send to computing system 202. Although not explicitly depicted, the examples of FIGS. 3A-3G may output an option granting computing system 202 consent to perform the techniques described herein. Thus, the user interacting with document management platform 102 of computing system 202 may have control over how information is collected about the user and used by computing system 202 and/or other computing systems or computing devices described herein.

Figure 3A:
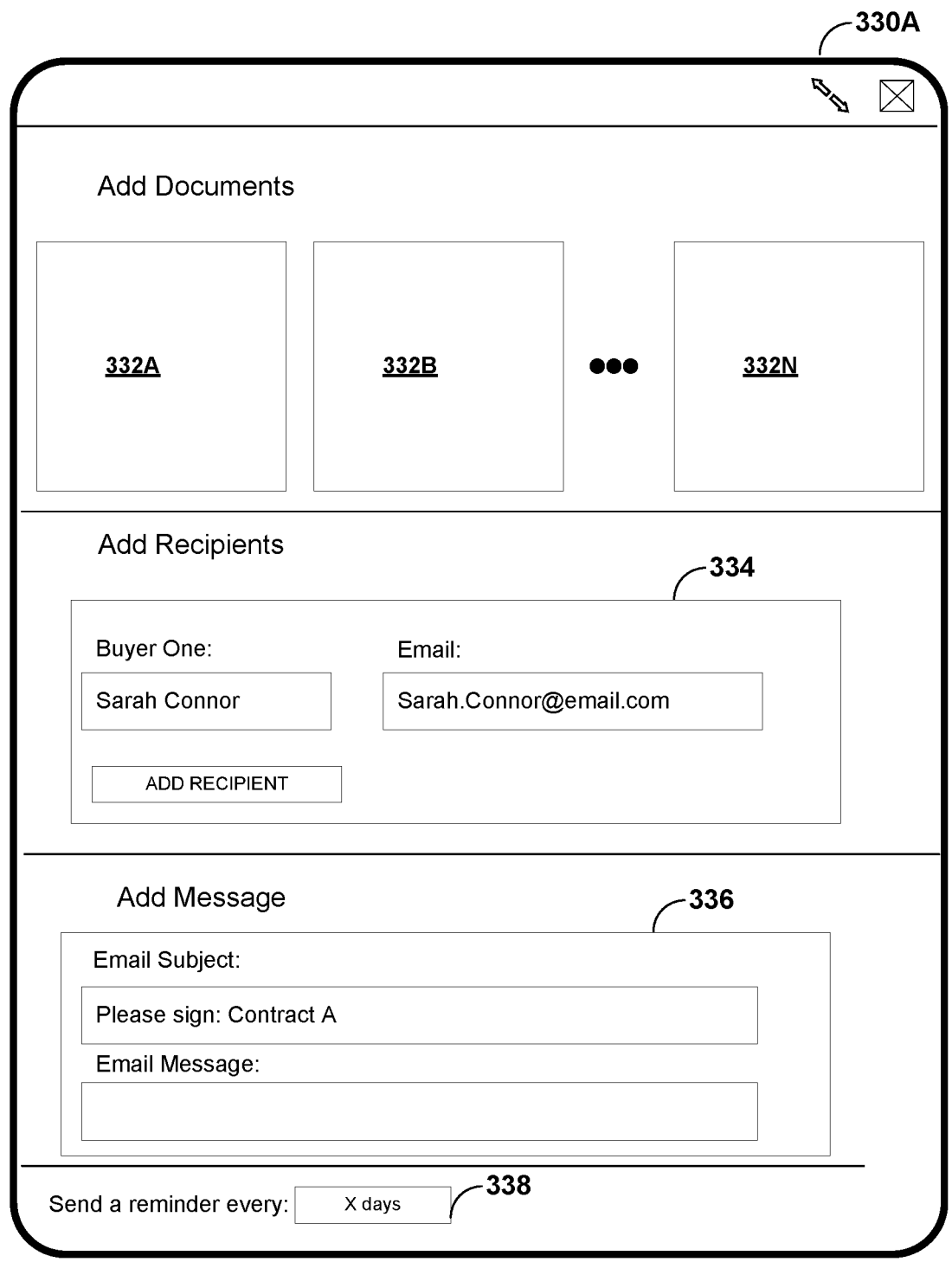

In the example of FIG. 3A, GUI 330A illustrates an example GUI for creating a document package (e.g., envelope) that includes one or more electronic documents for execution by a signer. GUI 330A of FIG. 3A includes electronic documents 332A-332N, recipient information 334, message 336, and reminder 338. Electronic documents 332A-332N may include electronic documents a user wants to include in a document package. Recipient information 334 may include graphical elements allowing a user to add information (e.g., name and electronic mail address) of one or more recipients of electronic documents 332A-332N. Message 336 may include graphical elements allowing a user to compose a message sent to the recipients specified in recipient information 334. Message 336 may send an electronic mail (email) including the message and electronic documents 332A-332N to the recipients specified in recipient information 334. Reminders 338 may include an option for a user to send periodic reminders to the recipients specified in recipient information 334 to sign one or more electronic documents 332A-332N.

Figure 3B:
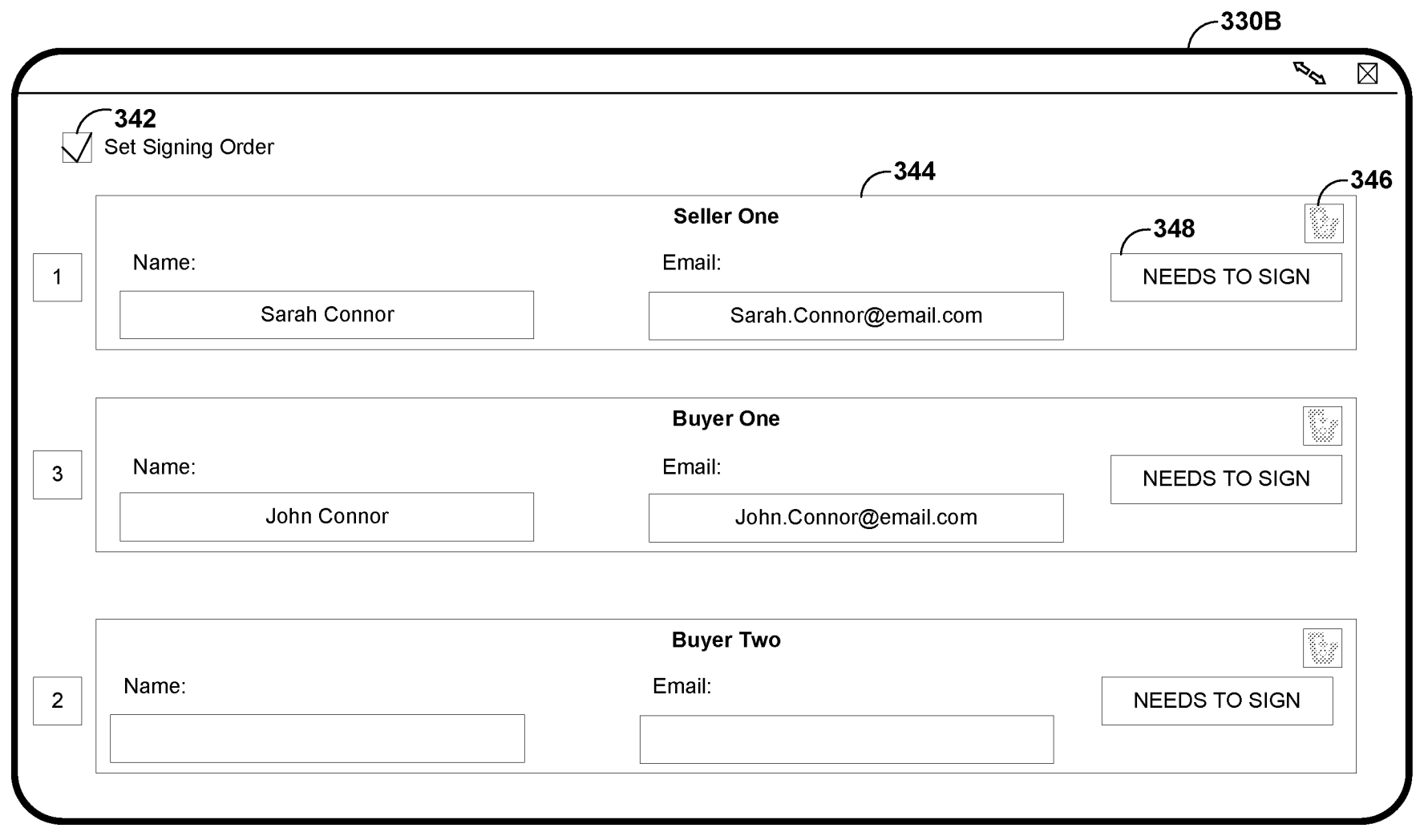

In the example of FIG. 3B, GUI 330B illustrates an example GUI for establishing one or more signers of an electronic document or document package. GUI 330B includes signing order 342, signer information 344, delete signer 346, and signer status 348. Signing order 342 may include graphical elements allowing a user to select which order a signer's signature appears on one or more electronic documents. Signer information 344 may include graphical elements allowing a user to input information (name and electronic mail address) about one or more signers of electronic documents. Signer information 344 may include an indication of a signer's role (e.g., seller one, buyer one, buyer two) in a transaction associated with the one or more electronic documents to be executed by the signers. Signer information 344 may also include delete signer 346. Delete signer 346 may include graphical elements allowing a user to delete a signer entry included in signer information 344. Signer information 344 may also include signer status 348. Signer status 348 may include graphical elements indicating whether a signer has signed the one or more electronic documents.

Figure 3C:
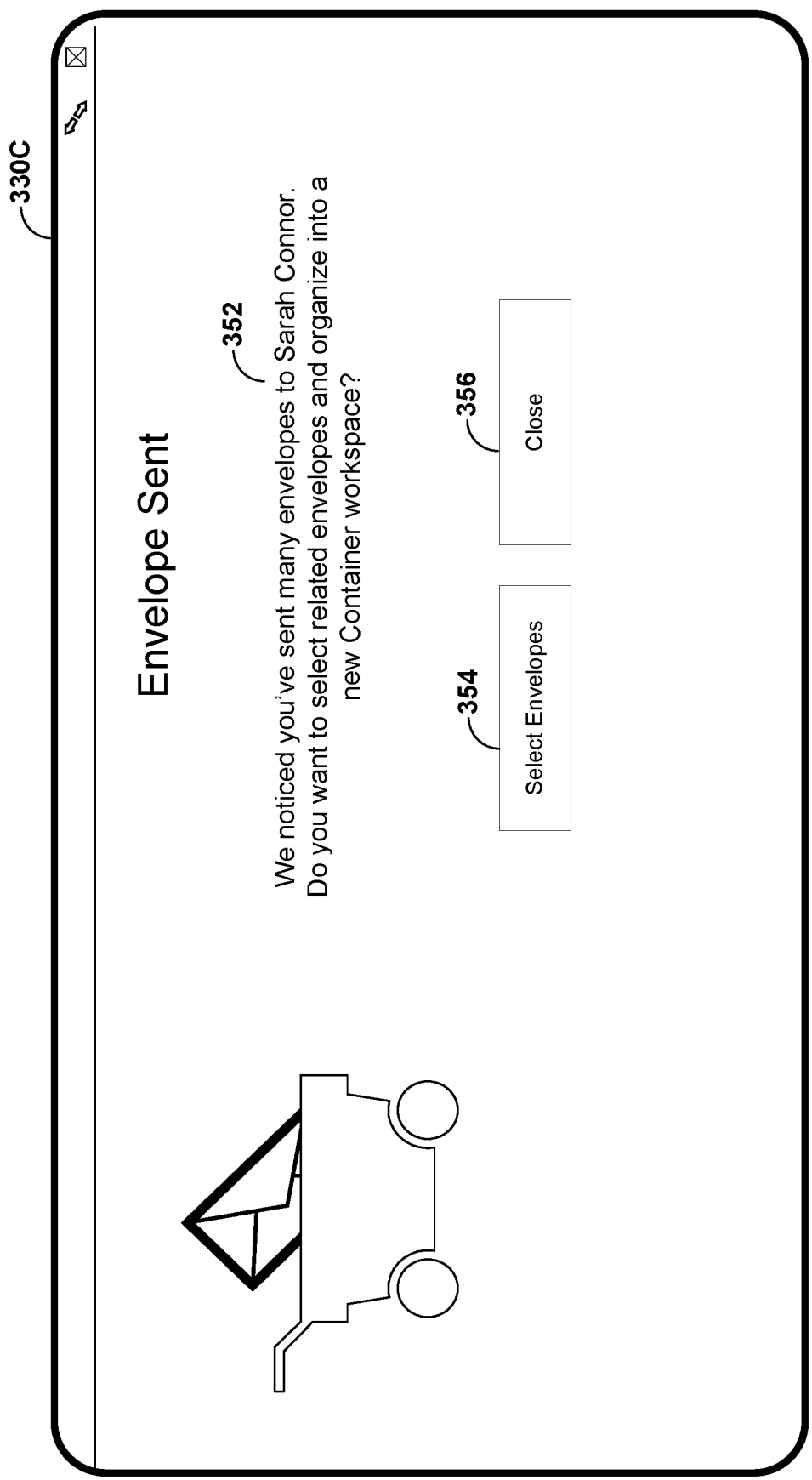

In the example of FIG. 3C, GUI 330C illustrates an example GUI requesting permission from a user to generate a container for the provided input document. GUI 330C may include prompt 352, accept button 354, and decline button 356. Prompt 352 may include graphical elements with text explaining to a user that a container may be created based on a recently sent document package (e.g., envelope). For example, prompt 352 may include text such as "we noticed you've sent many envelopes to Sarah Connor. Do you want to select related envelopes and organize into a new Container workspace?". Decline button 356 may include graphical elements a user may select to "close" GUI 330C and not create a container. Accept button 354 may include graphical elements a user may select to "select envelopes" to include in a container. In response to a user selecting accept button 354, computing system 202 may redirect the user to GUI 330D of FIG. 3D.

In the example of FIG. 3D, GUI 330D illustrates an example GUI allowing a user to select related documents to include in a container. GUI 330D may include select radio buttons 358. Select radio buttons 358 may include a graphical element allowing a user to select one or more electronic documents or document packages to include in a container. In the example of FIG. 3D, each button of radio buttons 358 may be associated with a corresponding envelope name 362, recipient names 364, sent date 366, and similarity score 368. Radio buttons 358 may include one or more names of envelopes under envelope name 362 based on candidate documents selected by suggestion engine 114. Radio buttons 358 may also optionally include at least one of recipient names 364, sent date 366, and similarity score 368 associated with each envelope name of envelope name 362.

In some instances, GUI 330D may present the one or more candidate envelopes in descending order based on the value of similarity score 368. Similarity score 368 may include graphical elements that displays a similarity score for each envelope. Similarity score 368 may display corresponding similarity scores determined by scoring module 116. In some instances, GUI 330D may not include similarity score 368. For example, GUI 330D may order each radio button 358 entry in descending order based on a similarity score generated by scoring module 116, without displaying similarity score 368. GUI 330D may also include find more button 370. Find more button 370 may include graphical elements that allows a user to refresh options included in radio buttons 358. In response to a user selecting find more button 370, suggestion engine 114 may select new or additional envelopes to include in GUI 330D. Suggestion engine 114 may select new or additional envelopes to include in GUI 330D by instructing scoring module 116 to recalculate similarity scores for each candidate envelope determined by detection engine 112. Suggestion engine 114 may also select new or additional envelopes to include in GUI 330D by instructing detection engine 112 to identify more candidate envelopes that were not previously identified.

Radio buttons 358 may indicate user selections of which envelopes to include in a container. In the example of FIG. 3D, radio buttons 358 associated with "contract A," "contract B," "contract D," and "contract E" may be selected by a user. Container module 106 may receive the selected buttons of radio buttons 358 and generate a container that includes envelopes associated with the selected buttons of radio buttons 358. In response to container module 106 generating the container, computing system 202 may redirect the user to GUI 330E of FIG. 3E.

Figure 3E:
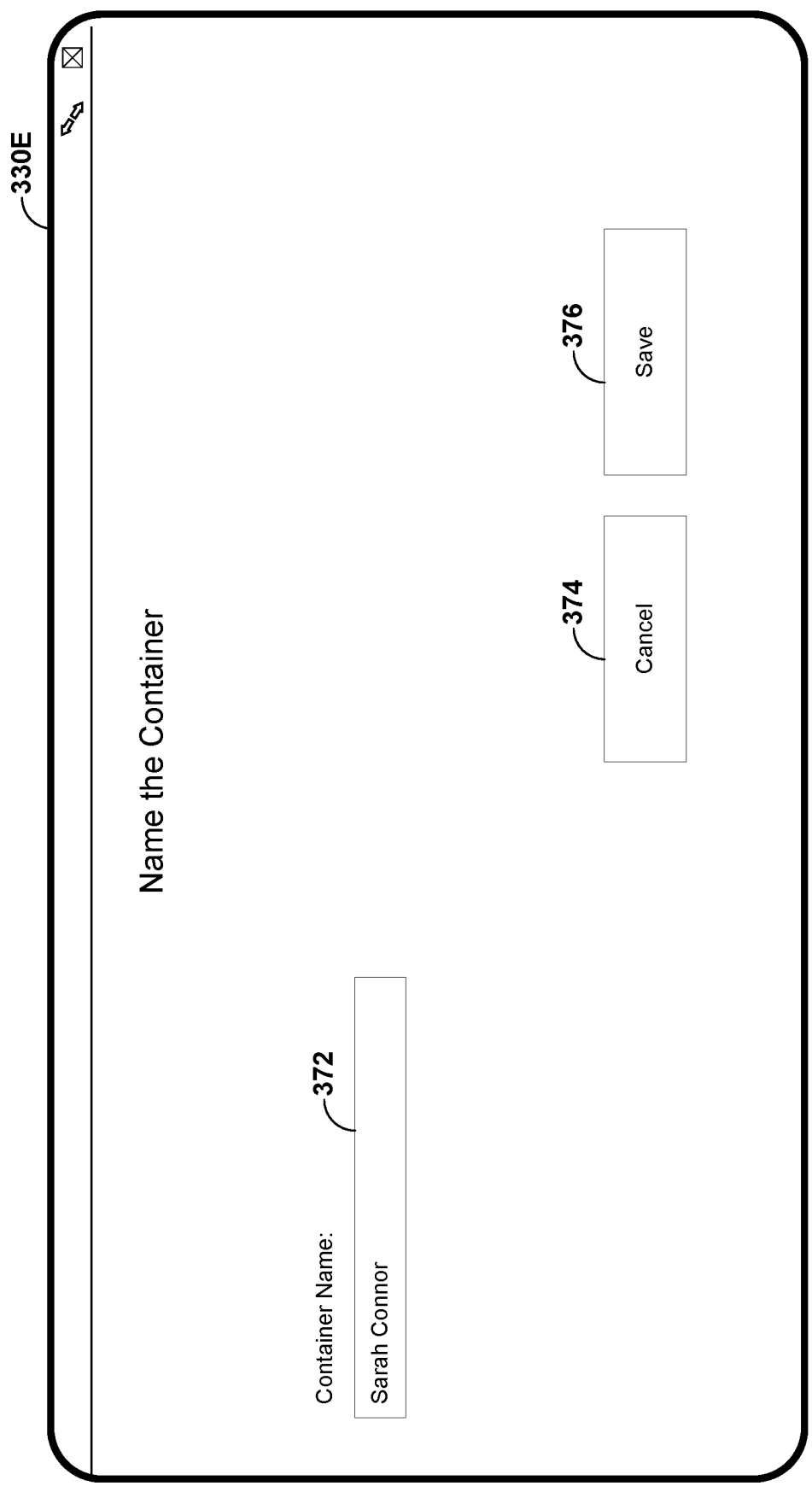

In the example of FIG. 3E, GUI 330E illustrates an example GUI prompting a user to assign a name to the container. GUI 330E may include container name field 372, cancel button 374, and save button 376. Container name field 372 may include graphical elements to allow a user to input a name or identifier (e.g., "Sarah Connor") for the container generated by container module 106. Cancel button 374 may include graphical elements allowing a user to close GUI 330E. In response to a user not providing a name for the container and selecting cancel button 374, container module 106 may assign a unique name to the container according to any known conventional naming methods. Save button 376 may include graphical elements allowing a user to save the value in container name field 372 as the container name. In response to a user selecting save button 376, container module 106 may assign the value of container name field 372 as the name of the container.

Figure 3F:
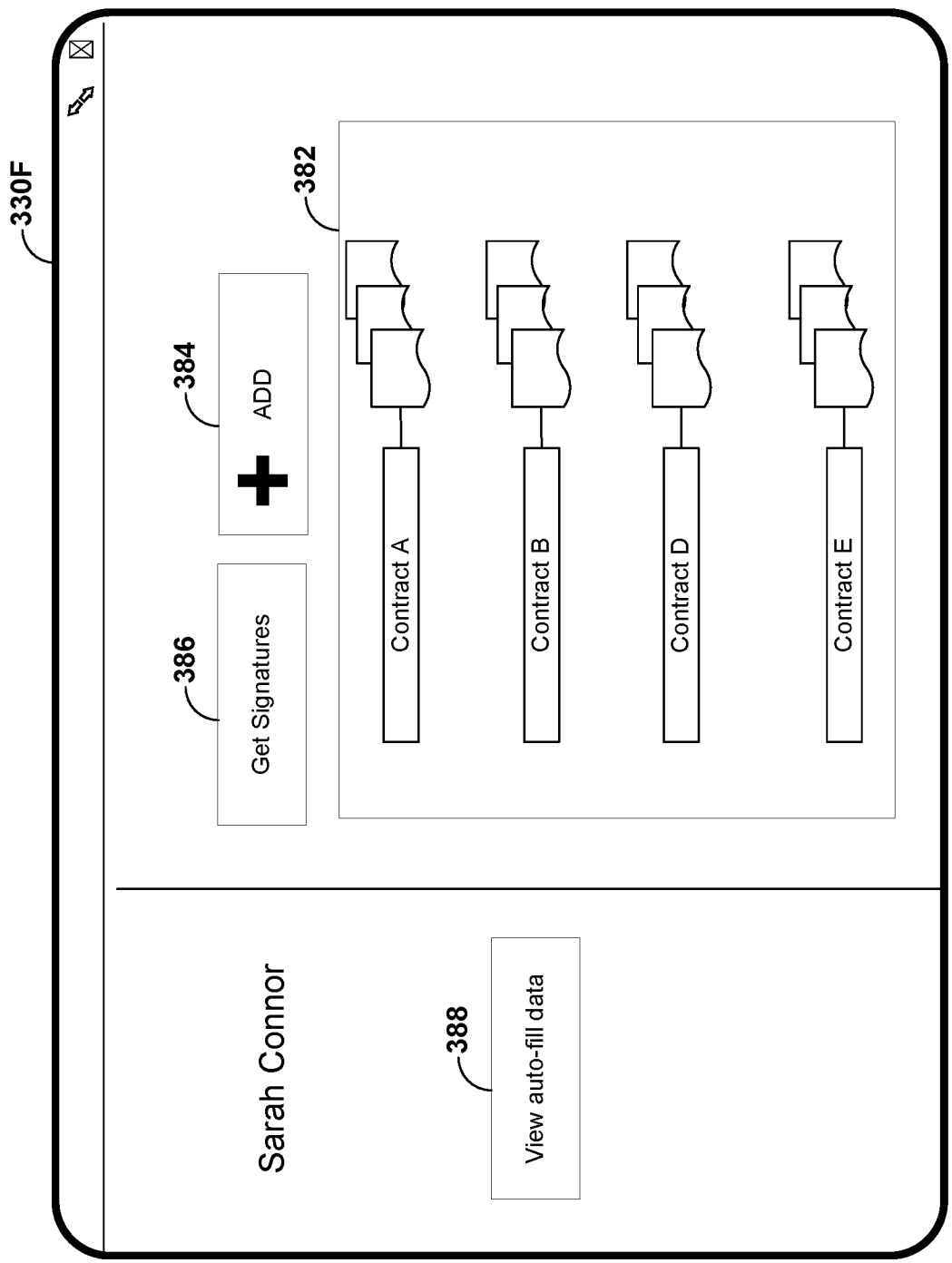

In the example of FIG. 3F, GUI 330F illustrates an example GUI for managing the electronic documents included in the container (e.g., the "Sarah Connor" container). GUI 330F includes envelopes 382, add envelopes button 384, get signatures button 386, and view auto-fill data button 388. Envelopes 382 may include graphical elements that list which envelopes are included in the container. Add button 384 may include graphical elements to allow a user to manually add an envelope or individual electronic document to the container. Get signatures buttons 386 may include graphical elements to allow a user to execute documents in envelopes 382 for execution by a signer (e.g., a user of signer device 109B of FIG. 1). View auto-fill data button

388 may include graphical elements to allow a user to view, modify, add, or delete common fields determined by auto-fill module 118. Auto-fill module 118 may determine common fields by compiling one or more fields shared by at least two documents of envelopes 382. View auto-fill data button 388 may provide a user the opportunity to change the determined common fields and/or automatically populate documents of envelopes 382 with the values associated with the determined common fields. In response to a user selecting view auto-fill button 388, computing system 202 may redirect a user to GUI 330G.

Figure 3G:
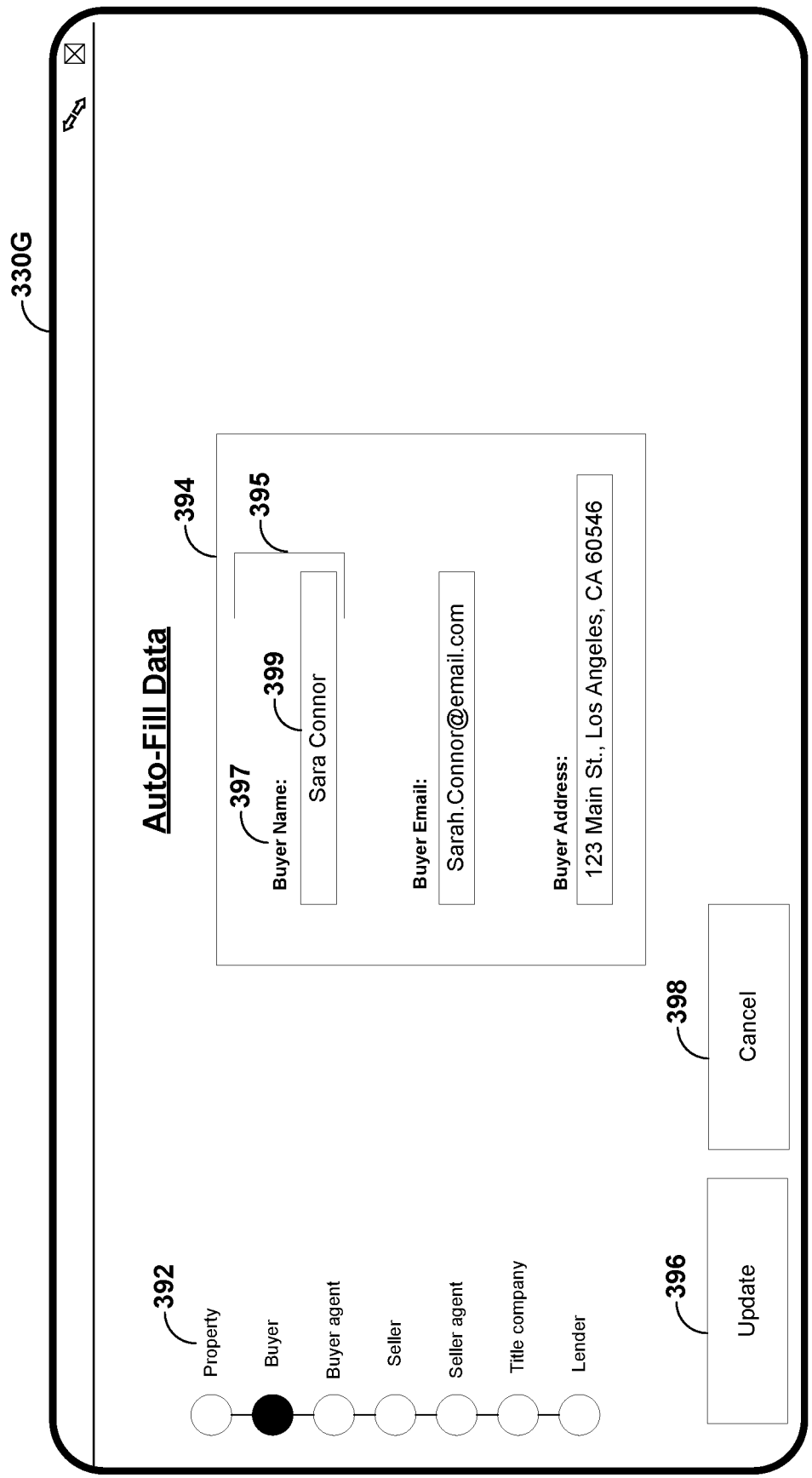

In the example of FIG. 3G, GUI 330G illustrates an example GUI for managing common fields included in the container. GUI 330G may include common field types 392, common field data 394, update button 396, and close button 398. Common field types 392 may include graphical elements indicating broad classifications of fields (e.g., property, buyer, buyer agent, seller, seller agent, title company, lender, etc.) associated with the common fields determined by auto-fill module 118. Common field types 392 may indicate information associated with fields that may be duplicative among documents stored in a container generated by container module 106. Auto-fill module 118 may populate common field data 394 with values included in the determined common fields. Common field data 394 may include graphical elements to allow a user to view, modify, add, or delete values of common fields determined by auto-fill module 118. Common field data 394 may include field 395. Field 395 may include graphical elements indicating a field in which at least two documents in the container have in common. Field 395 may include prompt 397 and tag 399. Prompt 397 may include graphical elements that indicate a specific classification (e.g., "buyer name") of field 395. Tag 399 may indicate a particular value of field 395 ("Sarah Connor"). Update button 396 may include graphical elements to allow a user to save any changes to common field data 394. In some instances, responsive to a user selecting update button 396, auto-fill module 118 may automatically populate at least one field of documents within a container generated by container module 106 with data specified in common field data 394. Cancel button 398 may close GUI 330G and any changes made to common field data 394 will not be saved by computing system 202.

Figure 4:
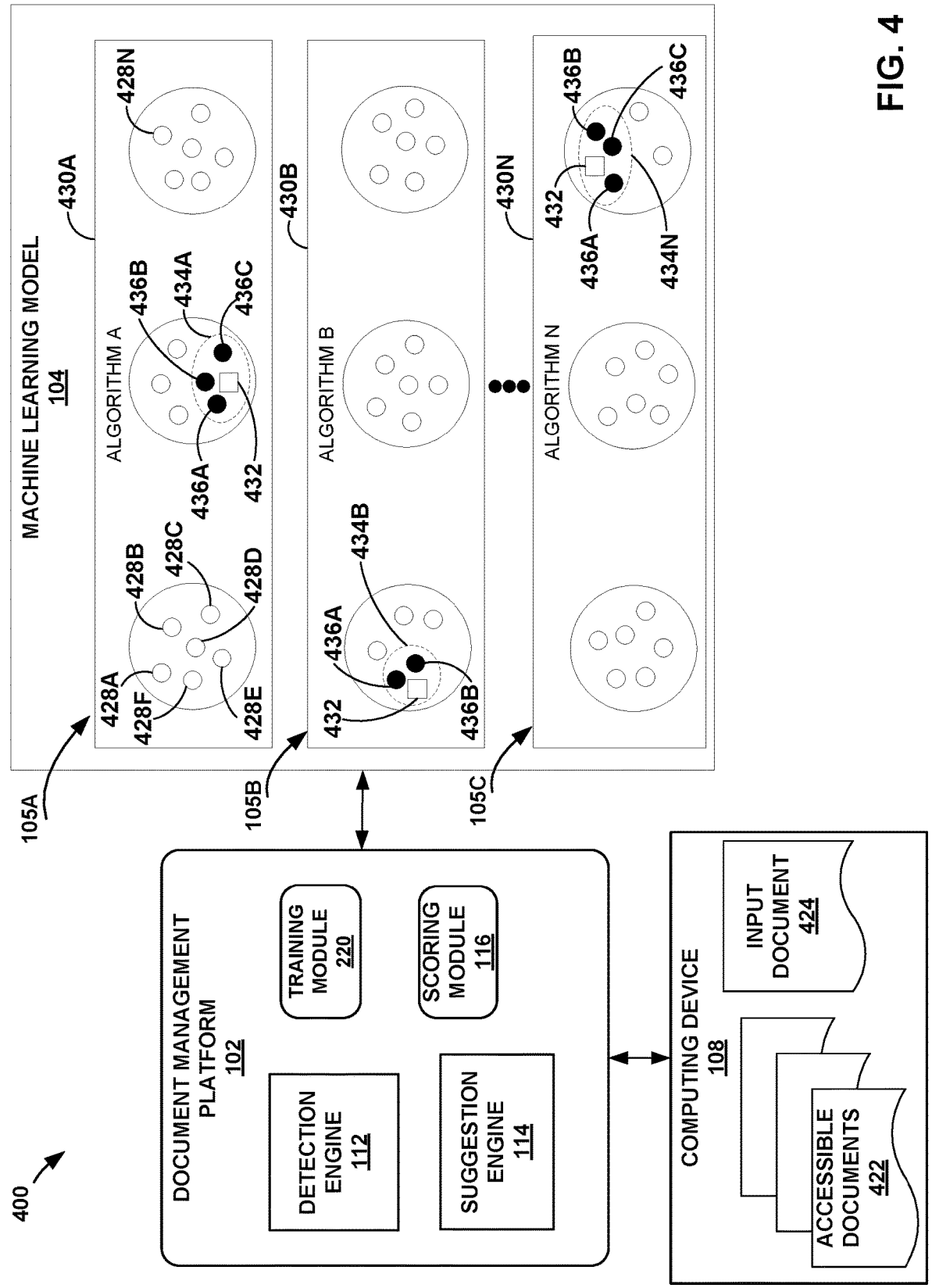
FIG. 4 is a block diagram illustrating grouping electronic documents using machine learning algorithms, in accordance with techniques of this disclosure.

FIG. 4 is a block diagram illustrating grouping electronic documents into clusters performed by machine learning algorithms 105A-105N (collectively referred to herein as "machine learning algorithms 105" or "clustering algorithms 105"), in accordance with techniques of this disclosure. In the example of FIG. 4, system 400 may include document management platform 102, machine learning model 104, and computing device 108. One or more aspects of FIG. 4 may be described herein within the context of FIG. 1 for example purposes only.

Document management platform 102 may execute on any computing device or computing system. Document management platform 102 may include training module 220, scoring module 116, detection engine 112, and suggestion engine 114

In some examples, computing device 108 may locally store accessible documents 422 and input document 424. In some instances, document management platform 102 may save accessible documents 422 (e.g., by using storage devices 110) responsive to receiving explicit consent from a user associated with computing device 108 to do so. Accessible documents 422 and input document 424 may be one or more electronic documents, electronic document packages (e.g., envelopes), or any other digital documents intended to be executed by a signer. In some examples, computing device 108 may generate input document 424 via a graphical user interface (GUI) provided by document management platform 102 (e.g., GUI 330A of FIG. 3A and GUI 330B of FIG. 3B). Document management platform 102 may request explicit consent from a user operating computing device 108 to analyze content of input document 424. In response to document management platform 102 receiving explicit user consent to analyze input document 424, detection engine 112 of document management platform 102 may use machine learning model 104 to identify candidate documents 436.

In accordance with the techniques of this disclosure, detection engine 112 may determine one or more attributes for input document 424. Detection engine 112 may determine attributes for input document 424 based on, for example, one or more parties indicated in input document 424, a subject matter indicated in input document 424, or a prompt and a corresponding tag of fields indicated in input document 424. Detection engine 112 may bundle the determined one or more attributes for input document 424 as input data point 432. Detection engine 112 may provide machine learning model 104 the input data point 432. Machine learning model 104 may execute on document management platform 102 or any other computing device or computing system.

Prior to receiving input data point 432, machine learning algorithms 105 of machine learning model 104 may apply at least one clustering algorithm to generate algorithmic cluster 430A-430N (collectively referred to herein as "algorithmic clusters 430"). In operation, document management platform 102 may request explicit consent from a user operating computing device 108 to use documents of accessible documents 422. In response to document management platform 102 receiving explicit consent to use documents of accessible documents 422, detection engine 112 of document management platform 102 may determine one or more attributes for each document of accessible documents 422. Detection engine 112 may bundle the one or more attributes for each document of accessible documents as accessible document data points 428A-428N (collectively referred to herein as "accessible document data points 428"). Detection engine 112 may send each accessible document data point 428 to machine learning model 104. Machine learning model 104 may use one or more clustering algorithms 105 to map each accessible document data point 428 into a cluster of algorithmic clusters 430A-430N. In the example of FIG. 4, accessible document data points 428 represent all the circles in each cluster of algorithmic clusters 430.

In some instances, machine learning algorithms 105 may generate algorithmic clusters 430 that each include one or more clusters. Machine learning algorithms 105 may generate each cluster within each algorithmic clusters 430 by plotting accessible document data points 428 on a graph. For example, machine learning algorithm 105A may plot accessible document data points 428 on a graph with N-dimensions, where N is equal to the number of attributes provided to machine learning algorithm 105A. Machine learning algorithm 105A may create one or more clusters of algorithmic clusters 430A based on a density of all accessible document data points 428 in particular regions of the graph with N-dimensions (e.g., density-based clustering model DBSCAN). Machine learning algorithms 105B and 105N may similarly create clusters by applying different clustering algorithms (KMeans, KPrototypes, Spectral Clustering, Hierarchical Clustering, etc.).

In response to receiving input data point 432, machine learning model 104 may map input data point 432 into a cluster generated by one or more clustering algorithms 105. For example, machine learning model 104 may map input data point 432 in a cluster of algorithmic clusters 430A (e.g., the second cluster of algorithmic cluster 430A generated by algorithm A). Machine learning algorithm 105B may similarly map input data point 432 in a cluster of algorithmic clusters 430B, machine learning algorithm 105N may similarly map input data point 432 in a cluster of algorithmic clusters 430N, and so on. In some instances, clustering algorithms 105 used to generate clusters for each algorithmic clusters 430 may be trained with different data sets. Regardless of training data used to train the creation of clusters for algorithmic clusters 430, each cluster of algorithmic clusters 430 performs similar processes.

Detection engine 112 may receive the mapping of input data point 432 in the clusters of algorithmic clusters 430A-430N. Detection engine 112 may determine which accessible document data points 428 may be classified as candidate document 436A-436B (collectively referred to herein as "candidate documents 436"). For example, detection engine 112 may determine an accessible document data point of accessible document data points 428 is candidate document 436A by using a distance metric. For example, detection engine 112 may use a Euclidean distance to determine how far away an accessible document data point of accessible document data points 428 may be from input data point 432 in a cluster for the accessible document data point to be labeled as a candidate document of candidate documents 436. In other words, detection engine 112 may determine candidate documents 436 by setting input data point 432 as a core point. Detection engine 112 may also determine a threshold distance value based on a distance metric (e.g., Euclidean distance, Manhattan distance, Mikowski distance, Hamming distance, etc.). Detection engine 112 may establish a threshold distance value according to a distance metric representing a minimum or maximum distance a candidate document 436 may be located in a respective cluster relative to input data point 432.

Scoring module 116 of document management platform may determine a similarity score for each candidate document 436. In some examples, scoring module 116 may apply weights to determine the similarity score for candidate documents 436. Scoring module 116 may apply weights to influence how the distance value measured for each algorithmic clusters 430A-430N should be considered, as can be seen in table 1 below. Distance values determined for each algorithmic cluster 430 may include a percentage indicating how far candidate documents 436 are from input data point 432. For example, if candidate document 436A is identical to input data point 432, the distance value may indicate 100% correlation within a given algorithmic cluster 430. In another example, if candidate document 436C barely satisfies the candidate document threshold, the distance value may indicate a similarity score close to a base percentage (33%). Scoring module 116 may determine a similarity score for each candidate document 436 by normalizing the distance values determined for each algorithmic cluster 430 according to assigned weights assigned to each algorithmic cluster 430.

| Candidate Document | Algorithmic cluster 430A | Algorithmic cluster 430B | Algorithmic cluster 430N | Similarity Score |
|---|---|---|---|---|
| 436A | α * distance(436A) | β * distance(436A) | ω * distance(436A) | 91% |
| 436B | α * distance(436B) | β * distance(436B) | ω * distance(436B) | 88% |
| 436C | α * distance(436C) | β * distance(436A) | ω * distance(436C) | 62% |

Training module 220 may establish weights α, β, and ω with synthetic training data. Training module 220 may use synthetic data stored in storage devices 110 of FIG. 1. Training module 220 may use synthetic data of documents with known similarity scores. Training module 220 may calibrate weights α, β, and ω based on how algorithmic clusters 430 performed in predicting a known similarity score. Training module 220 may calibrate weights α, β, and ω such that the sum of α, β, and ω will be equal to one. For example, if algorithmic cluster 430A perfectly predicted the known similarity score for synthetic documents, training module 220 would assign a value of one to α and zero to other weights. In another example, if algorithmic cluster 430B was slightly inaccurate in predicting the known similarity score for synthetic documents, training module 220 may assign a value less than one to β (while keeping the sum of α, β, and ω equal to one).

In some instances, training module 220 may determine a weight for cluster algorithms 105 based on user accounts, responsive to explicit user consent. Training module 220 may use machine learning model 104 to update the weights α, β, and ω based on learned user account patterns. For example, training module 220 may apply the user-input to train machine learning model 104 to learn user account patterns dynamically and proactively. In other words, training module 220 may train machine learning model 104 via validation or reinforcement learning. For example, suggestion engine 114 may select which candidate documents 436 are related documents based on user-input selecting which candidate documents 436 are related documents. Suggestion engine 114 may send training module 220 the user input to train machine learning model 104 with the data representing user input that indicates which of the related documents are in fact related to the input document. Training module 220 may iteratively adjust the weights used for generating the similarity score each time an input document is received.

Figure 5:
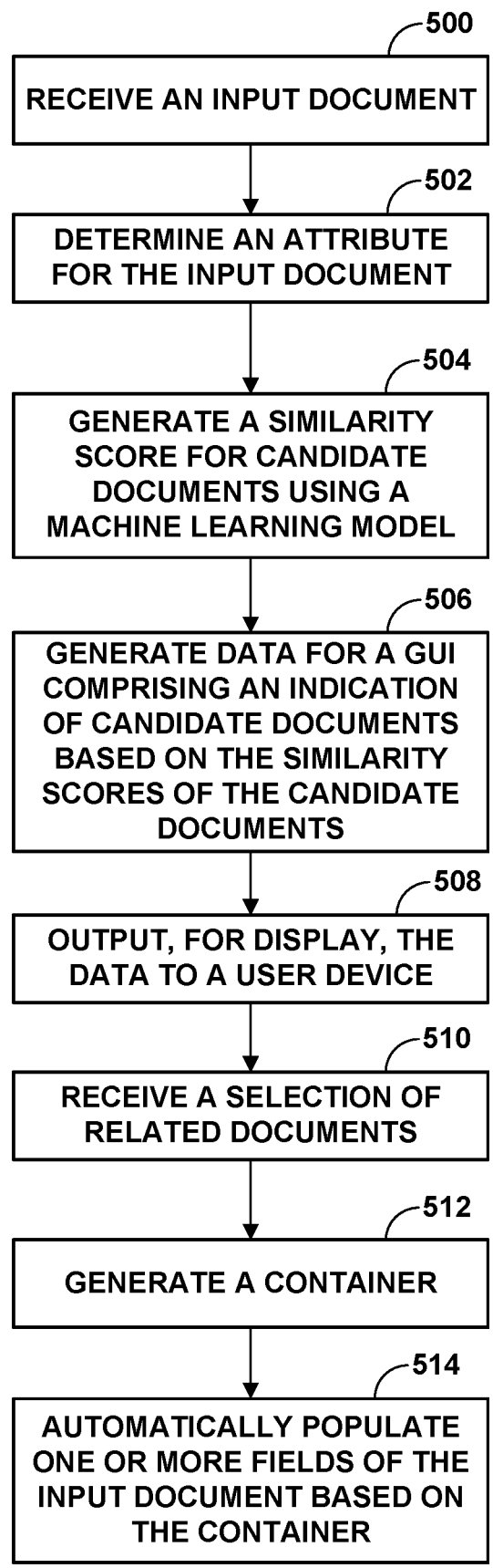
FIG. 5 is a flow chart illustrating an example process to generate a container, in accordance with techniques of this disclosure.

FIG. 5 is a flow chart illustrating an example mode of operation for a documentation platform to generate containers, in accordance with techniques of this disclosure. One or more aspects of FIG. 5 may be described herein within the context of FIGS. 1, 2, 3A-3G and 4.

In the example of FIG. 5, document management platform 102 may receive an input document (500). In some examples, document management platform 102 may obtain a document package (e.g., envelope) that may include the input document and the attribute for the input document. Document management platform 102 may generate containers for document packages similar to how document management platform 102 generated containers for documents, as described herein. In some instances, document management platform 102 may obtain the input document from the user device after receiving explicit consent from a user of the user device.

Document management platform 102 may determine an attribute for input document 424 (502). In some examples, input document 424 may be an electronic document, electronic document package, or other digital document to be executed by a signer (e.g., a user of signer device 109N). Document management platform 102 may determine an attribute for input document 424 based on, for example, contractual parties indicated in input document 424, a subject matter indicated in input document 424, or values of fields (e.g., tag) and associated field prompts indicated in input document 424. Document management platform 102 may provide machine learning algorithms 105 of machine learning model 104 the determined attributes as input data point 432. In some examples, after training module 220 trains machine learning model 104, machine learning model 104 may assign input data point 432 to a cluster of algorithmic clusters 430A-430N. Document management platform 102, may determine candidate documents 436 based on a distance metric threshold. Document management platform 102 may also identify candidate documents accessible to a user account associated with the user of the user device, responsive to receiving explicit consent of the user to use and/or access the candidate documents. In some examples, document management platform 102 may determine attributes for the input document responsive to obtaining the input document from sender device 108B.

In some examples, the input document may include content, an indication of signers, an indication of a subject of the input document, or an indication of a prompt and a tag of a field identified in the input document. Document management platform 102 may determine the attribute for the input document based on at least one of the content of the input document, the indications of signers included in the input document, an indication of a subject of the input document, or an indication of a prompt and a tag of a field identified in the input document.

Document management platform 102 may generate a similarity score for each candidate document 436 using machine learning module 104 (504). Document management platform 102 may determine a distance of each candidate document for each algorithmic clusters 430A based on a distance metric. Document management platform 102 may generate a similarity score for each candidate document 436 by normalizing the determined distance value for each algorithmic clusters 430A.

In some instances, document management platform 102 may provide machine learning model 104 with a plurality of synthetic or training documents. Document management platform 102 may train machine learning model 104 with the plurality of synthetic documents by grouping the plurality of test documents into clusters with ensemble clustering. Document management platform 102 may be able to train machine learning model 104 to appropriately determine a similarity score for electronic documents by providing synthetic documents with known similarity scores.

In some instances, document management platform 102 may use machine learning model 104 to generate a similarity score for each of the plurality of candidate documents. Document management platform 102 may use machine learning model 104 to map each of the plurality of candidate documents and the input document into the clusters. Document management platform 102 may use machine learning model 104 to determine a distance metric based on the attribute. Document management platform 102 the similarity score based on the distance metric.

Document management platform 102 may generate data for a graphical user interface comprising an indication of at least a subset of the candidate documents based on the similarity scores generated for each of the plurality of candidate documents (506). In some examples, document management platform 102 may only include indications of candidate documents that satisfy a similarity score threshold. In some instances, suggestion engine 114 of document management platform 102 may generate data for a graphical user interface in a way that presents the candidate documents in descending order based on the similarity score of the candidate document. In other words, document management platform 102 may be configured to generate an ordered list based on the similarity score. Document management platform 102 may be configured to generate data for the graphical user interface that may include the ordered list and select the one or more related documents based on one or more thresholds associated with the ordered list.

Document management platform 102 may output, for display, the data to a user device (508). For example, document management platform 102 may output the data of the graphical user interface to sender device 108B. Document management platform 102 may output GUI 330D of FIG. 3D to sender device 108B, for example.

Document management platform 102 may receive a selection of related documents (510). For example, document management platform 102 may receive an indication of a user input from the user device. Document management platform 102 may receive a user input that may indicate at least the subset of the plurality of candidate documents as the one or more related documents to be included in the container. In some instances, sender device 108 may send a signal to document management platform 102 indicating which candidate documents are related documents. In response to receiving the signal, document management platform 102 may select the related documents. In some instances, document management platform 102 may select, based on the similarity score for each of the plurality of candidate documents, one or more related documents from the subset of the plurality of candidate documents.

Document management platform 102 may generate a container including the selected related documents and the input document (512). Document management platform 102 may also generate a container comprising the input document and the one or more related documents. In some examples, the input document may include a first field and a related document may include a second field. Document management platform 102 may also be configured to include common fields of the input document and at least one related document in the container. Document management platform 102 may include common fields in the container by, for example, comparing tag/prompt combinations of fields in the input document and fields in the related documents.

Document management platform 102 may automatically populate one or more fields of the input document based on the container (514). For example, document management platform 102 may be configured to generate data for the graphical user interface based on the container. The data for the graphical user interface may include a common field associated with the first field and the second field (e.g., GUI 330D) of FIG. 3D. Document management platform 102 automatically populating one or more fields of the input document based on the container is described in more detail in the description of FIG. 6, for example.

Figure 6:
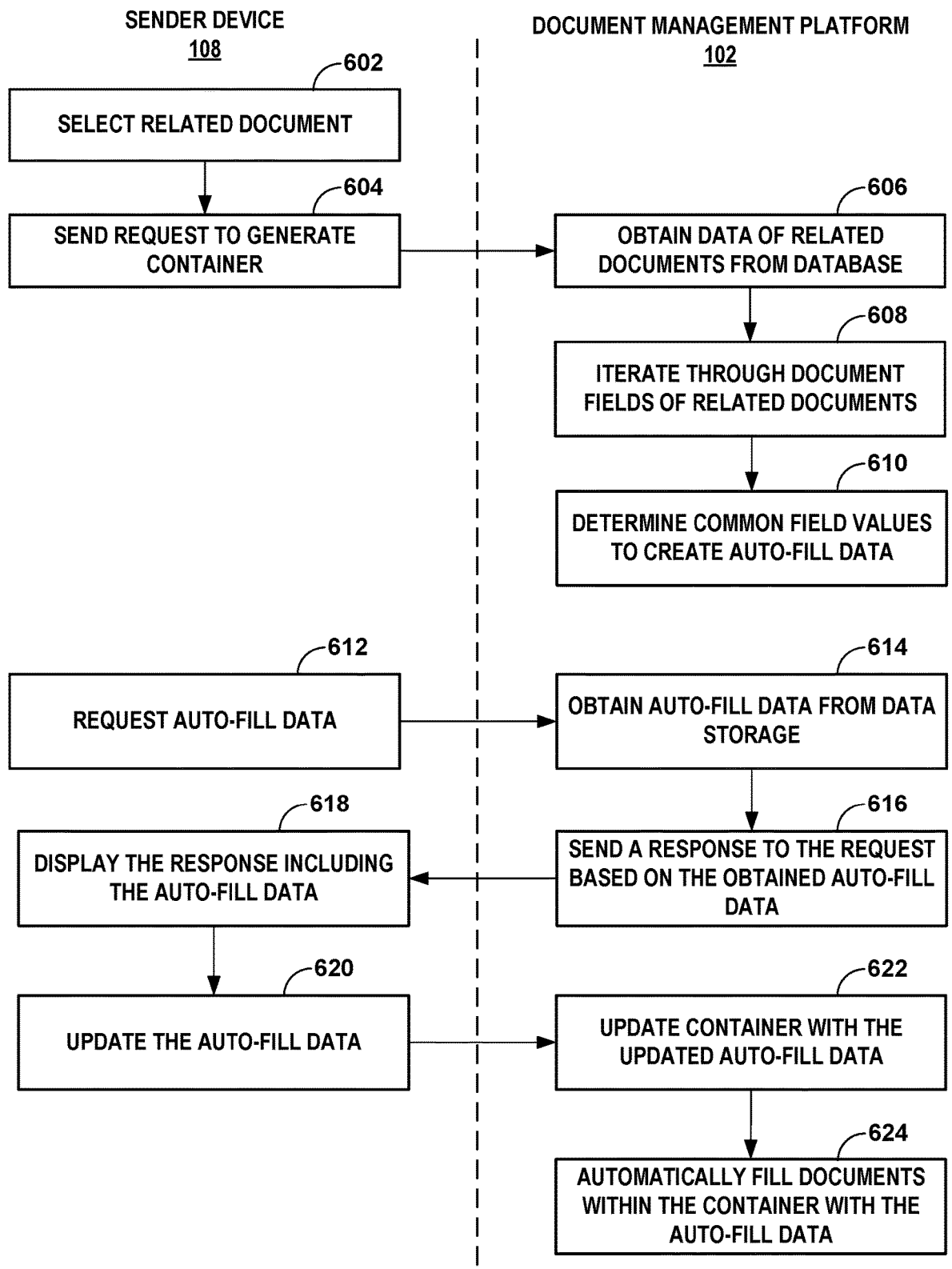
FIG. 6 is a flow chart illustrating an example process to automatically fill fields in electronic documents, in accordance with one or more aspects of the present disclosure.

FIG. 6 is a flow chart illustrating an example process to automatically fill fields in electronic documents, in accordance with one or more aspects of the present disclosure. One or more aspects of FIG. 6 are described herein within the context of FIGS. 1, 2, 3A-3G and 4 for example purposes only. In the example of FIG. 6, sender device 108 may correspond to sender device 108B of FIG. 1, for example.

Document management platform 102 may also correspond to document management platform 102 described previously.

In accordance with the techniques described herein, sender device 108 may select related documents (602). In some instances, sender device 108 may receive a signal from suggestion engine 114 of document platform 102 that includes data for a GUI (e.g., GUI 330D of FIG. 3D). Sender device 108 may send a request to document management platform 102 to generate a container (604). Sender device 108 may send a request to generate a container that includes the selected related documents in step 602. In response to receiving a request from sender device 108 to generate a container that includes the selected related documents, document management platform may obtain data of related documents from a database (606). For example, container module 106 of document management platform 102 may query an internal or external database to obtain references, fields, etc. of the related documents indicated in the request sent by sender device 108. Document management platform 102 may also iterate through fields of the related documents (608). For example, auto-fill module 118 of document management platform 102 may analyze prompts and tags of each field of each related document. Document management platform 102 may also determine common field values to create auto-fill data (610). For example, auto-fill module 118 of document management platform 102 may determine common field values by comparing prompts and corresponding tags of at least two related documents within a container. Auto-fill module 118 may compile the determined common fields and generate data for a GUI (e.g., GUI 330G of FIG. 3G).

In some instances, sender device 108 may request the auto-fill data created by document management platform 102 (612). Sender device 108 may request the auto-fill data to confirm, add, remove, or otherwise change values (e.g., tags) of prompts associated with the determined common fields. Sender device 108 may also request the auto-fill data to automatically populate tags of fields within one or more electronic documents. In response to receiving the request for the auto-fill data from sender device 108, document management platform 102 may obtain the auto-fill data from a data storage (614). For example, auto-fill module 118 may obtain the auto-fill data from the container stored in storage device 110. Document management platform 102 may send a response to the request received from sender device 108 based on the auto-fill data document management platform 102 obtained from the storage device (616). Sender device 108 may display the response including the requested auto-fill data (616). For example, sender device 108 may display the response in the form of a GUI (e.g., GUI 330G of FIG. 3G). In some instances, sender device 108 may update tags of common fields included in the auto-fill data (618). Sender device 108 may send the updates to document management platform 102. Document management platform, or more specifically auto-fill module 118, may update the container based on the user input received from sender device 108 (622). In some examples, document management platform 102 may automatically populate values of fields (e.g., tags) of one or more electronic documents with values specified in the updated auto-fill data (624).

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structures or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

The invention claimed is:

1. A system for electronic document management, wherein the system comprises one or more processors having access to a memory, the one or more processors configured to:
   determine an attribute for an input document for execution by a signer;
   generate a similarity score for each of a plurality of candidate documents using a machine learning model, wherein using the machine learning model comprises providing the attribute as an input to the machine learning model;
   determine a subset of the candidate documents based on the similarity scores generated for each of the plurality of candidate documents;
   based on a determination that a field classification for a first field of the input document corresponds to a field classification for a second field of a related document of the subset of the candidate documents, generate a common field that includes the field classification of the first field; and
   set one or more of a first field value of the first field or a second field value of the second field to a common field value of the common field.

2. The system of claim 1, wherein the one or more processors are further configured to:
   generate a container comprising the input document and the related document;
   update the container to include the common field;
   add, based on a determination that an electronic document is related to at least the input document and the related document stored in the container, the electronic document to the container; and
   based on the electronic document being added to the container and a determination that a field classification for a third field of the electronic document corresponds to the field classification of the common field, set a third field value of the third field to the common field value of the common field.

3. The system of claim 2, wherein to generate the container, the one or more processors are configured to:
   generate data for a graphical user interface, the data comprising an indication of the subset of the candidate documents;
   output, for display, the data to a user device;
   receive, from the user device, an indication of a selection indicating the related document from the subset of the candidate documents; and
   generate, based on the indication of the selection, the container including the input document and the related document.

4. The system of claim 1, wherein to determine the subset of the candidate documents, the one or more processors are configured to:
   generate an ordered list of the plurality of candidate documents based on the similarity scores generated for each of the plurality of candidate documents; and
   determine the subset of the candidate documents from the plurality of candidate documents based on one or more thresholds associated with the ordered list.

5. The system of claim 1, wherein the one or more processors are further configured to:
   obtain an envelope comprising the input document and the attribute for the input document.

6. The system of claim 1, wherein the one or more processors are further configured to:
   obtain the input document from a user device, wherein the input document is accessible to a user account associated with the user device, and wherein the plurality of candidate documents are accessible to the user account.

7. The system of claim 1, wherein the one or more processors are configured to determine the attribute for the input document responsive to obtaining the input document.

8. The system of claim 1, wherein the one or more processors are further configured to:
   provide the machine learning model with a plurality of synthetic documents; and
   train the machine learning model with the plurality of synthetic documents by grouping the plurality of synthetic documents into clusters with ensemble clustering.

9. The system of claim 8, wherein to generate the similarity score for each of the plurality of candidate documents, the one or more processors are further configured to:
   map each of the plurality of candidate documents and the input document into the clusters; and
   determine a distance metric based on the attribute, wherein the one or more processors are configured generate the similarity score based on the distance metric.

10. The system of claim 1, wherein the input document comprises content, and wherein the one or more processors are further configured to:
    determine the attribute for the input document based on the content.

11. The system of claim 1, wherein an envelope comprises the input document and an indication of a subject of the input document, and wherein the one or more processors are further configured to:
 determine the attribute based on the subject of the input document.

12. The system of claim 1, wherein an envelope comprises the input document and an indication of the field classification for the first field of the input document and the first field value identified in the input document, and wherein the one or more processors are further configured to:
 determine the attribute based on the field classification for the first field and the first field value identified in the input document.

13. The system of claim 1, wherein the common field value corresponds to the second field value of the second field, and wherein to set one or more of the first field value of the first field or the second field value of the second field to the common field value of the common field, the one or more processors are configured to set the first field value of the first field to the common field value of the common field.

14. The system of claim 1, wherein the one or more processors are further configured to:
 generate data for a graphical user interface, the data comprising an indication of at least the common field;
 output, for display, the data to a user device;
 receive, from the user device, a signal indicating a new common field value for the common field;
 update the common field value of the common field to the new common field value based on the signal received from the user device; and
 wherein to set one or more of the first field value of the first field or the second field value of the second field to the common field value of the common field, the one or more processors are configured to modify both the first field value of the first field to the new common field value and the second field value of the second field to the new common field value.

15. A method comprising:
 determining an attribute for an input document for execution by a signer;
 generating a similarity score for a plurality of candidate documents using a machine learning model, wherein using the machine learning model comprises providing the attribute as an input to the machine learning model;
 determining a subset of the candidate documents based on the similarity scores generated for each of the plurality of candidate documents;
 determining that a field classification for a first field of the input document corresponds to a field classification for a second field of a related document of the subset of the candidate documents;
 based on the determination that the field classification for the first field corresponds to the field classification for the second field, generating a common field that includes the field classification of the first field; and
 setting one or more of a first field value of the first field or a second field value of the second field to a common field value of the common field.

16. The method of claim 15, further comprising:
 generating a container comprising the input document and the related document;
 updating the container to include the common field;
 determining that an electronic document is related to at least the input document and the related document stored in the container;
 adding, based on the determination that the electronic document is related to documents stored in the container, the electronic document to the container;
 determining a field classification for a third field of the electronic document corresponds to the field classification of the common field; and
 based on adding the electronic document to the container and determining the field classification for the third field corresponds to the field classification for the common field, setting a third field value of the third field to the common field value of the common field.

17. The method of claim 16, wherein generating the container comprises:
 generating data for a graphical user interface, the data comprising an indication of the subset of the candidate documents;
 outputting, for display, the data to a user device;
 receiving, from the user device, an indication of a selection indicating the related document from the subset of the candidate documents; and
 generating, based on the indication of the selection, the container including the input document and the related document.

18. The method of claim 15, wherein determining the subset of the candidate documents comprises:
 generating an ordered list of the plurality of candidate documents based on the similarity scores generated for each of the plurality of candidate documents; and
 determining the subset of the candidate documents from the plurality of candidate documents based on one or more thresholds associated with the ordered list.

19. Computer readable storage media encoded with instructions that, when executed, cause one or more processors of a computing device to:
 determine an attribute for an input document for execution by a signer;
 generate a similarity score for each of a plurality of candidate documents using a machine learning model, wherein using the machine learning model comprises providing the attribute as an input to the machine learning model;
 determine a subset of the candidate documents based on the similarity scores generated for each of the plurality of candidate documents;
 based on a determination that a field classification for a first field of the input document corresponds to a field classification for a second field of a related document of the subset of the candidate documents, generate a common field that includes the field classification of the first field; and
 set one or more of a first field value of the first field or a second field value of the second field to a common field value of the common field.

20. The computer readable storage media of claim 19, wherein the instructions further cause the one or more processors to:
 generate a container comprising the input document and the related document;
 update the container to include the common field;
 add, based on a determination that an electronic document is related to at least the input document and the related document stored in the container, the electronic document to the container; and
 based on the electronic document being added to the container and a determination that a field classification for a third field of the electronic document corresponds to the field classification of the common field, set third a field value of the third field to the common field value of the common field.

\* \* \* \* \*